US012593112B2

(12) United States Patent
Maze et al.

(10) Patent No.: US 12,593,112 B2
(45) Date of Patent: *Mar. 31, 2026

(54) METHOD, DEVICE, AND COMPUTER PROGRAM FOR ENCAPSULATING REGION ANNOTATIONS IN MEDIA TRACKS

(71) Applicant: CANON KABUSHIKI KAISHA, Tokyo (JP)

(72) Inventors: Frédéric Maze, Langan (FR); Franck Denoual, Saint Domineuc (FR); Hervé Ruellan, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,454

(22) Filed: Mar. 31, 2023

(65) Prior Publication Data

US 2023/0353842 A1      Nov. 2, 2023

(30) Foreign Application Priority Data

Apr. 5, 2022      (GB) ...................................... 2204978
Jul. 11, 2022      (GB) ...................................... 2210183

(51) Int. Cl.
*H04N 21/84*          (2011.01)
*G11B 27/34*          (2006.01)

(52) U.S. Cl.
CPC ............. *H04N 21/84* (2013.01); *G11B 27/34* (2013.01)

(58) Field of Classification Search
CPC ............... H04N 21/84; H04N 21/4728; H04N 21/8146; H04N 21/816; H04N 21/8456; H04N 21/85406; H04N 21/845; G11B 27/34; G06F 16/48; G06F 16/41; G06F 16/7837; H04L 69/06; H04L 69/22

USPC ........................................................... 386/239
See application file for complete search history.

(56) References Cited

U.S. PATENT DOCUMENTS

| | | | |
|---|---|---|---|
| 2014/0132758 A1 | 5/2014 | Saptharishi et al. | |
| 2017/0346873 A1* | 11/2017 | Denoual | H04N 21/845 |
| 2018/0261254 A1* | 9/2018 | Wang | G11B 27/102 |
| 2020/0053282 A1* | 2/2020 | Wang | H04N 21/816 |
| 2021/0409798 A1* | 12/2021 | Maze | H04N 21/234327 |
| 2022/0239949 A1* | 7/2022 | Hannuksela | H04N 21/2353 |

FOREIGN PATENT DOCUMENTS

| | | |
|---|---|---|
| GB | 2596325 A | 12/2021 |
| JP | 2021093627 A | 6/2021 |
| WO | 2021/056050 A1 | 4/2021 |

* cited by examiner

*Primary Examiner* — Loi H Tran
(74) *Attorney, Agent, or Firm* — Canon U.S.A., Inc. IP Division

(57) ABSTRACT

The present invention concerns a method of generating a media file, the method comprising: generating a first track of media data samples; generating a region track associated with the first track, each sample of the region track comprising a region description data structure comprising geometry information of one or more regions in at least one corresponding sample of the first track; wherein the region description data structure comprises a region identifier associated with each region; and the method further comprise: generating a region annotation in a container; generating association metadata associating a region identifier with the region annotation; generating a media file including the first track, the region track, the region annotation, and the association metadata.

20 Claims, 8 Drawing Sheets

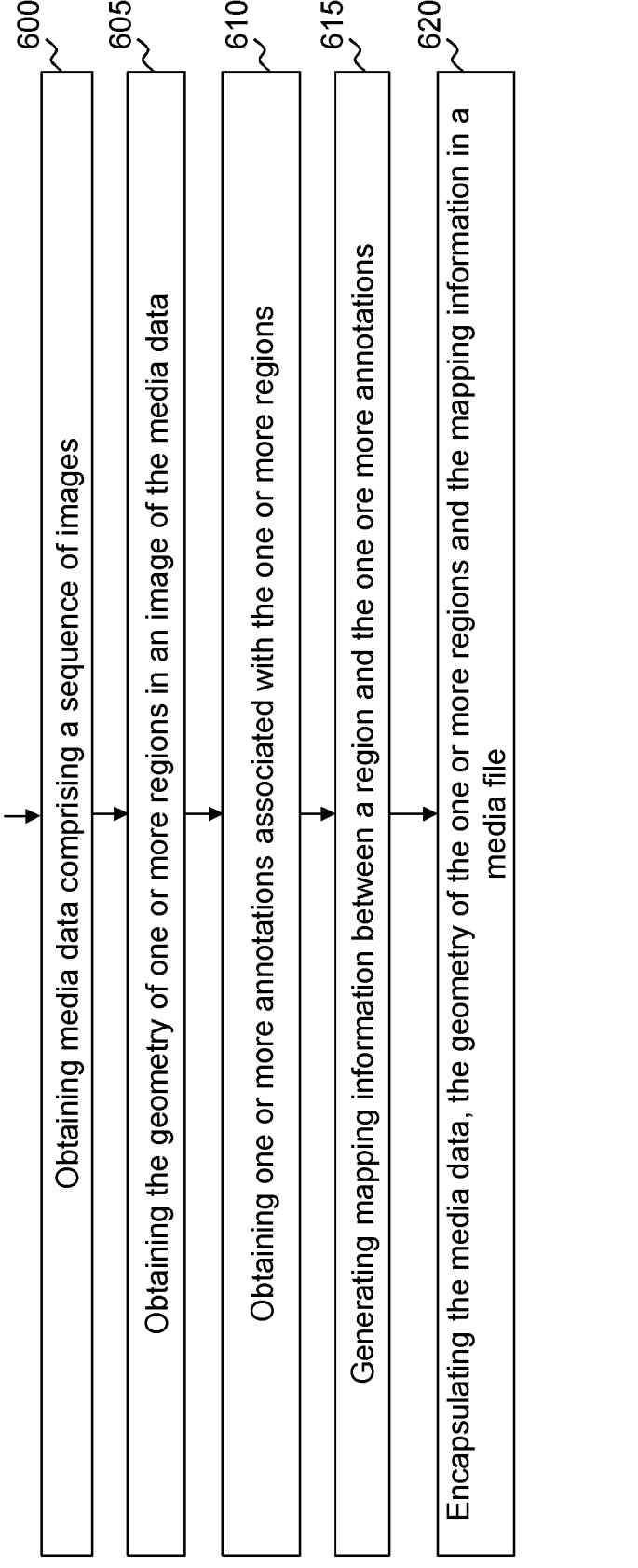

600 Obtaining media data comprising a sequence of images

605 Obtaining the geometry of one or more regions in an image of the media data

610 Obtaining one or more annotations associated with the one or more regions

615 Generating mapping information between a region and the one ore more annotations 620 Encapsulating the media data, the geometry of the one or more regions and the mapping information in a media file

Fig. 6

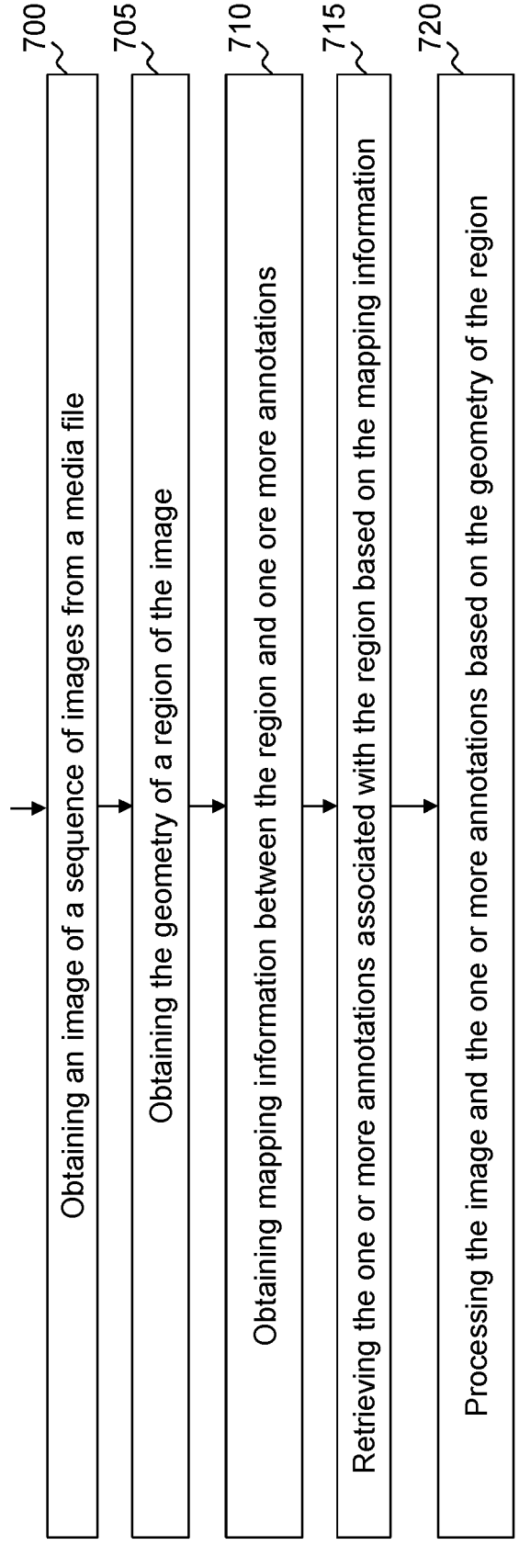

700   Obtaining an image of a sequence of images from a media file

705   Obtaining the geometry of a region of the image

710   Obtaining mapping information between the region and one ore more annotations 715   Retrieving the one or more annotations associated with the region based on the mapping information 720   Processing the image and the one or more annotations based on the geometry of the region

Fig. 7

METHOD, DEVICE, AND COMPUTER PROGRAM FOR ENCAPSULATING REGION ANNOTATIONS IN MEDIA TRACKS

PRIORITY CLAIM/INCORPORATION BY REFERENCE

This application claims the benefit under 35 U.S.C. § 119 (a)-(d) of United Kingdom Patent Application No. 2204978.7, filed on Apr. 5, 2022 and entitled "METHOD. DEVICE, AND COMPUTER PROGRAM FOR ENCAP- SULATING REGION ANNOTATIONS IN MEDIA TRACKS", and United Kingdom Patent Application No. 2210183.6, filed on Jul. 11, 2022 and entitled "METHOD, DEVICE, AND COMPUTER PROGRAM FOR ENCAP- SULATING REGION ANNOTATIONS IN MEDIA TRACKS".

The above cited patent applications are incorporated herein by reference in its entirety.

FIELD OF THE INVENTION

The present invention relates to a method, a device, and a computer program for encapsulating and parsing region annotations in media tracks, making it possible to efficiently associate annotations with regions in media tracks.

BACKGROUND OF THE INVENTION

Modern cameras and image analysis services enable to generate annotations (e.g., metadata such as human-readable or computer-readable metadata, images, image sequences, video or audio) associated with a portion of, a subpart of, or even an object within the images, image sequences or video. For example, a camera may generate the focusing region for a video or detect faces while recording a video. As another example, a deep-learning system may detect objects inside a sequence of moving images.

Images or videos captured by a camera and/or processed by an image analysis service are stored on a storage device like a memory card for example or transmitted over a communication network. The recorded videos are typically encoded to reduce the size of data on the storage device or over the network and encapsulated in a file format describ- ing the encoded images or videos. After being stored or transmitted through a communication network, the encap- sulated images or videos can be processed and possibly rendered by media players. For example, videos may be encapsulated using the ISO Base Media File Format (ISOBMFF) to produce an ISO Base Media file or a set of ISOBMFF segments. For example, images or burst of images may also be stored as items or image sequences using the Image File Format (also denoted HEIF for High Efficiency Image File Format), which is an extension based on the ISO Base Media File Format.

The International Standard Organization Base Media File Format (ISO BMFF, ISO/IEC 14496-12) is a well-known flexible and extensible file format that encapsulates and describes encoded timed or non-timed media data or bit- streams either for local storage or for transmission via a network or via another bitstream delivery mechanism. This file format has several extensions, e.g., Part-15, ISO/IEC 14496-15 that describes encapsulation tools for various NAL (Network Abstraction Layer) unit-based video encod- ing formats. Examples of such encoding formats are AVC (Advanced Video Coding), SVC (Scalable Video Coding), HEVC (High Efficiency Video Coding), L-HEVC (Layered HEVC), and VVC (Versatile Video Coding). Another example of file format extension is ISO/IEC 23008-12 that describes encapsulation tools for still images or for sequence of still images such as HEVC Still Image. Still another example of file format extension is ISO/IEC 23090-2 that defines the omnidirectional media application format (OMAF). Still other examples of file format extension are ISO/IEC 23090-10 and ISO/IEC 23090-18 that define the carriage of Visual Volumetric Video-based Coding (V3C) media data and Geometry-based Point Cloud Compression (G-PCC) media data.

This file format is object-oriented. It is composed of building blocks called boxes (or data structures, each of which being identified by a four characters code, also denoted FourCC or 4CC). Full boxes are data structures similar to boxes, further comprising a version and flag value attributes. In the following, the term box may designate both full boxes or boxes. These boxes or full boxes are sequen- tially or hierarchically organized. They define parameters describing the encoded timed or non-timed media data or bitstream, their structure and the associated timing, if any. In the following, it is considered that encapsulated media data designate encapsulated data comprising metadata and media data (the latter designating the bitstream that is encapsu- lated). All data in an encapsulated media file (media data and metadata describing the media data) is contained in boxes. There is no other data within the file. File-level boxes are boxes that are not contained in another box.

While these ISOBMFF-based file formats have proven to be efficient, there are several limitations with regards to the encapsulation and association of annotations with multiple regions in samples of media tracks. These encapsulation standards do not provide easy and efficient means to asso- ciate descriptions or annotations (e.g., metadata such as human-readable or computer-readable metadata, images, image sequences, video or audio) with individual regions within an image or within a sequence of images in an interoperable way. "Easy means" should be interpreted here as processable by a generic ISOBMFF reader or ISOBMFF- based standard reader and supporting any types of annota- tions (e.g., metadata track, image or metadata item, video track, item properties, sample properties), with a common and flexible signaling mechanism. "Efficient means" should be interpreted here as allowing reducing the description cost and avoiding the duplication of information when associat- ing annotations with individual regions of a sample.

SUMMARY OF THE INVENTION

The present invention has been devised to address one or more of the foregoing concerns.

According to a first aspect of the invention, it is proposed a method of encapsulating media data in a media file, the method comprising:

generating a first track of media data samples;

generating a region track associated with the first track, each sample of the region track comprising a region description data structure describing one or more regions in at least one corresponding sample of the first track, each region described in a region track sample being identified by a region identifier;

wherein:

the metadata describing the region track comprises an indication for indicating that a set of at least some of the region identifiers used in the region track are persistent over a set of at least some of the region track samples.

In an embodiment, the indication is provided in an entry of a sample description box describing region track samples, the set of region track samples being the region track samples described by the entry of the sample description box.

In an embodiment, the indication is provided in an entry of a sample group description box for describing a group of region track samples, the set of region track samples being the region track samples belonging to the group.

In an embodiment, the indication is provided in a track header of the region track, the set of region track samples being all the region track samples of the region track.

In an embodiment, the indication further comprises a description of the set of region identifiers.

In an embodiment, the description of the set of region identifiers is a range of region identifiers.

In an embodiment, the description of the set of region identifiers is a list of region identifiers ranges.

In an embodiment, the description of the set of region identifiers is a list of region identifiers.

In an embodiment, the description of the set of region identifiers indicates that the set of region identifiers comprises all the region identifiers.

According to another aspect of the invention, it is proposed a method for parsing a media file, the method comprising:

obtaining a first track of media data samples from the media file;

obtaining a region track associated with the first track from the media file, each sample of the region track comprising a region description data structure describing one or more regions in at least one corresponding sample of the first track, each region described in a region track sample being identified by a region identifier;

wherein the method further comprises:

obtaining an indication from the metadata describing the region track, the indication indicating that a set of at least some of the region identifiers used in the region track are persistent over a set of at least some of the region track samples; and identifying the regions in the media data samples of the first track based on the region track samples and based on the indication.

According to another aspect of the invention, it is proposed a computer program product for a programmable apparatus, the computer program product comprising a sequence of instructions for implementing a method according to the invention, when loaded into and executed by the programmable apparatus.

According to another aspect of the invention, it is proposed a computer-readable storage medium storing instructions of a computer program for implementing a method according to the invention.

According to another aspect of the invention, it is proposed a computer program which upon execution causes the method of the invention to be performed.

According to another aspect of the invention, it is proposed a device for encapsulating media data in a media file, the device comprising a processor configured for:

generating a first track of media data samples;

generating a region track associated with the first track, each sample of the region track comprising a region description data structure describing one or more regions in at least one corresponding sample of the first track, each region described in a region track sample being identified by a region identifier;

4 wherein:

the metadata describing the region track comprises an indication for indicating that a set of at least some of the region identifiers used in the region track are persistent over a set of at least some of the region track samples.

According to another aspect of the invention, it is proposed a device for parsing a media file, the device comprising a processor configured for:

obtaining a first track of media data samples from the media file;

obtaining a region track associated with the first track from the media file, each sample of the region track comprising a region description data structure describing one or more regions in at least one corresponding sample of the first track, each region described in a region track sample being identified by a region identifier;

wherein the method further comprises:

obtaining an indication from the metadata describing the region track, the indication indicating that a set of at least some of the region identifiers used in the region track are persistent over a set of at least some of the region track samples; and identifying the regions in the media data samples of the first track based on the region track samples and based on the indication.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which:

FIG. 6 is a block diagram illustrating the main steps of a method to generate encapsulated media data and associated annotations according to some embodiments of the invention;

FIG. 7 is a block diagram illustrating the main steps of a method to obtain media data and associated annotations according to some embodiments of the invention.

DETAILED DESCRIPTION OF THE INVENTION

Figure 1:
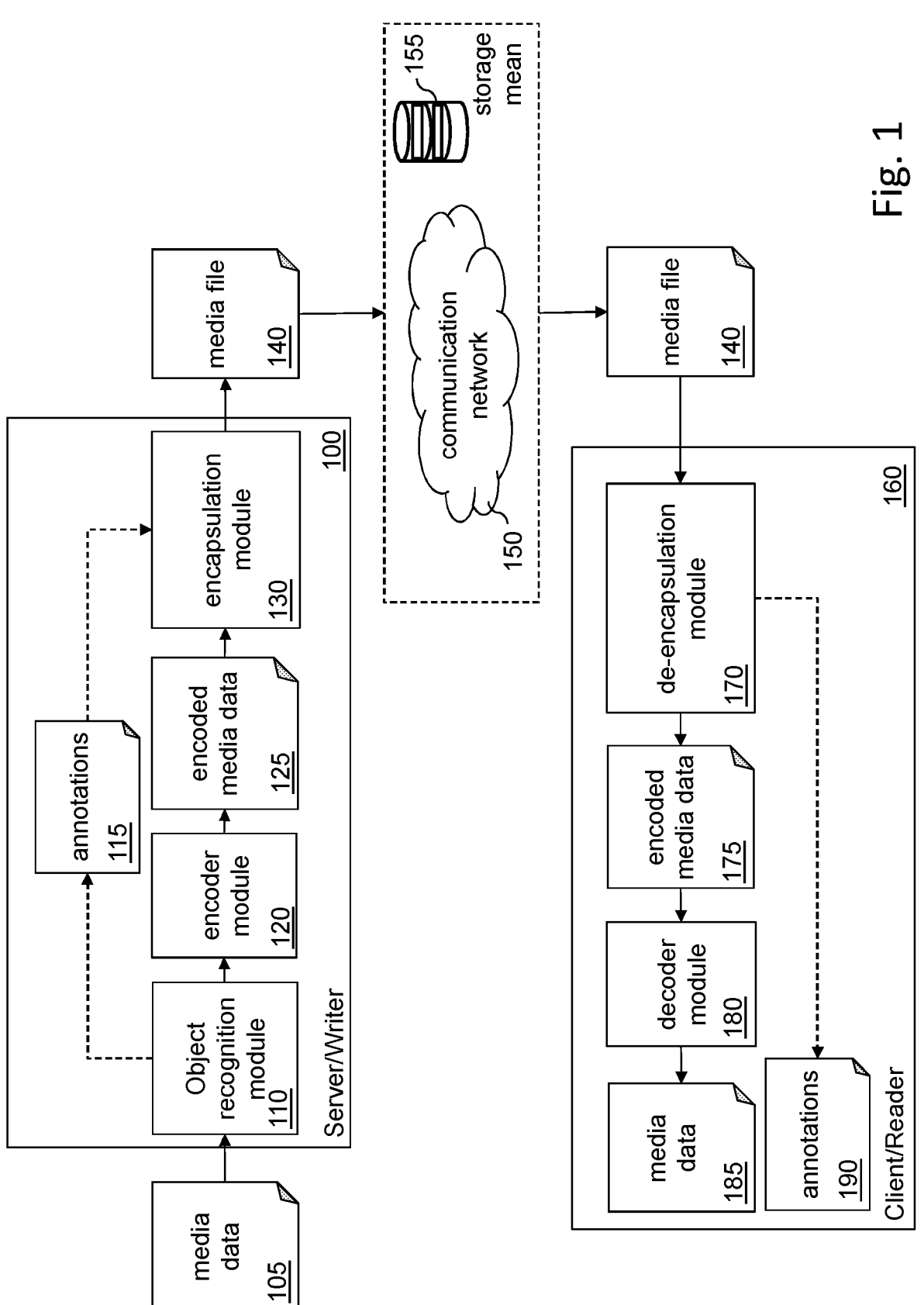
FIG. 1 illustrates an example of a system wherein some embodiments of the invention may be carried out.

In all the description the term image, sample, or frame is used as generic terms encompassing both 2D, 3D or volumetric images or frames. Similarly, the term video is used as a generic term encompassing both 2D videos and 3D videos or volumetric media. Volumetric media may encompass media encoded with G-PCC, V3C or V-PCC.

According to the ISO Base Media file format and other ISOBMFF-based specifications, a presentation of timed media data is described in a File-level box called a movie box (with the four-character code 'moov'). This movie box represents an initialization information container comprising a set of various boxes describing the presentation and its timing. It is logically divided into tracks represented by track boxes (with the four-character code 'trak'). Each track, uniquely identified by a track identifier track_ID, represents a timed sequence of media data belonging to the presentation (for example, a sequence of video frames, a sequence of subparts of video frames, a sequence of audio samples or a sequence of timed metadata samples). Unlike frames of a video, a sequence of images designates a timed sequence of images for which the timing is only advisory; it may be the timing at collection (e.g., of an image burst) or the suggested display timing (e.g., for a slideshow).

Within each track, each timed unit of data is called a sample; this might be a frame or a subpart of a frame of video, audio or timed metadata, or an image of a sequence of images. A sample is defined as all the media data associated with a same presentation time in a track. Samples are implicitly numbered in decoding order. Each track box comprises a hierarchy of boxes describing the samples of a track, e.g., a sample table box ('stbl') includes all the time and data indexing of the media samples in a track. In addition, the sample table box comprises a sample description box, identified with the four characters code 'stsd', including a set of sample entries, each sample entry giving the required information about the coding configuration, including a coding type identifying the coding format and various coding parameters characterizing the coding format, of media data in a sample, and any initialization information needed for decoding the sample. The actual sample data is stored in boxes called media data boxes, with the four-character code 'mdat', or identified media data boxes, with the four-character code 'imda', similar to the media data box but containing an additional identifier, at the same level as the movie box.

The movie may also be fragmented, i.e., organized temporally as a movie box containing information for the whole presentation followed by a list of movie fragments, i.e., a list of couples comprising a movie fragment box, identified with the four-character code 'moof', and a media data box ('mdat') or a list of couples comprising a movie fragment box ('moof') and an identified media data box ('imda').

Non-timed media data is described in a meta box (with the four-character code 'meta'). A unit of non-timed media data under this box and its hierarchy relates to "information item" or "item" instead of related samples. It is to be noted that the wording 'box' and the wording 'container' may be both used with the same meaning to refer to data structures that contain metadata describing the organization or/and properties of the image data in the file.

An ISOBMFF-compliant file may comprise at file-level both a movie box and a meta box or any one of them only.

FIG. 1 illustrates an example of a system wherein some embodiments of the invention may be carried out.

As illustrated, a server or writer referenced 100 is connected, via a network interface (not represented), to a communication network 150 to which is also connected, via a network interface (not represented), to a client or reader 160, making it possible for server or writer 100 and client or reader 160 to exchange a media file referenced 140 via communication network 150.

According to other embodiments, server or writer 100 may exchange media file 140 with client or reader 160 via storage means, for example the storage means referenced 155. Such storage means can be for example a memory module (e.g., Random Access Memory (RAM)), a hard disk, a solid-state drive, or any removable digital medium for example such as a disk or memory card.

According to the illustrated example, server or writer 100 aims at processing media data, for example the media data referenced 105, e.g., video data, for streaming or for storage purposes. To that end, server or writer 100 obtains or receives a media content comprising original media data or bitstream 105, e.g., a timed sequence of images or video frames, and uses an object recognition module 110 to identify and locate one or several objects that can be tracked through the sequence of images or video frames. Each detected object is described by a geometry giving a location and shape of a region generally surrounding the object in the image or frame. The detected objects and corresponding regions may move in the sequence of images over time and thus, potentially overlap at some point in time, appear or disappear. Annotations 115 can be associated with each region (e.g., metadata such as human-readable or computer-readable metadata, images, image sequences, samples of a video or audio or a whole video or audio bitstream). Annotations 115 may be generated by the object recognition module 110 or obtained by the server or writer 100 by external means. The obtained media data 105 may be encoded using an encoder module referenced 120 (e.g., video encoder) into the encoded media data referenced 125. Next, server or writer 100 encapsulates the encoded media data, the geometries of regions corresponding to detected objects and associated annotations into the one or more media files referenced 140, containing the encapsulated media data and associated annotations, using the encapsulation module referenced 130.

It is to be noted that the object recognition or detection step can be carried out by an external device in charge of content analysis for object recognition and communicating with the server or writer 100. The object recognition or detection step can also be performed before encoding or during encoding of the media data 105.

According to the illustrated example, server or writer 100 comprises at least one encapsulation module 130 to encapsulate the encoded media data 125 and associated annotations 115. Encoder module 120 may be implemented within server or writer 100 to encode the received media data, or it may be separate from server or writer 100. Encoder module 120 is optional, the server or writer 100 may encapsulate media data previously encoded in a different device or may encapsulate raw media data.

Encapsulation module 130 may generate one media file or a plurality of media files. This media file or plurality of media files correspond to encapsulated media data containing the encapsulation of alternative versions of the media data and/or successive fragments of the encapsulated media data.

Still according to the illustrated embodiment, client or reader 160 is used for processing encapsulated media data for displaying or outputting the media data to a user.

As illustrated, client or reader 160 obtains one or more media files, such as media file 140, via communication network 150 or from storage mean 155. Upon obtaining or receiving the media file, client or reader 160 parses and de-encapsulates the media file to retrieve the encoded media data referenced 175 using a de-encapsulation module referenced 170. Next, client or reader 160 decodes the encoded media data 175 with the decoder module referenced 180 to obtain the media data referenced 185 representing an audio and/or video content (signal) that can be processed by client or reader 160 (e.g., rendered or displayed to a user by dedicated modules not represented). It is noted that decoder module 180 may be implemented within client or reader 160 to decode the encoded media data, or it may be separate from client or reader 160. Decoder module 180 is optional; the client or reader 160 may receive a media file corresponding to encapsulated raw media data.

The de-encapsulation module 170 also allows obtaining from the media file the description of regions and the annotations 190 associated with each region of samples of the media data.

It is noted here that the media file or the plurality of media files, for example media file 140, may be communicated to de-encapsulation module 170 of client or reader 160 in a number of ways. For example, it may be generated in advance by encapsulation module 130 of server or writer 100 and stored as data in a remote storage apparatus in communication network 150 (e.g. on a server or a cloud storage) or a local storage apparatus such as storage means 155 until a user requests a media file encoded therein from the remote or local storage apparatus. Upon requesting a media file, the data is read, communicated, or streamed to de-encapsulation module 170 from the storage apparatus.

Server or writer 100 may also comprise a content providing apparatus for providing or streaming, to a user, content information directed to media files stored in the storage apparatus (e.g. content information may be described via a manifest file (e.g. a Media Presentation Description (MPD) compliant with the ISO/IEC MPEG-DASH standard, or a HTTP Live Streaming (HLS) manifest) including for example the title of the content and other descriptive metadata and storage location data for identifying, selecting, and requesting the media files). The content providing apparatus may also be adapted for receiving and processing a user request for a media file to be delivered or streamed from the storage apparatus to client or reader 160. Alternatively, server or writer 100 may generate the media file or the plurality of media files using encapsulation module 130 and communicates or streams it directly to client or reader 160 and/or to de-encapsulation module 170 as and when the user requests the content.

The user has access to the audio/video media data (signal) through a user interface of a user terminal comprising client or reader 160 or a user terminal that has means to communicate with client or reader 160. Such a user terminal may be a computer, a mobile phone, a digital camera, a tablet or any other type of device capable of providing/displaying the media data to the user.

For the sake of illustration, the media file or the plurality of media files such as media file 140 represent encapsulated media data into boxes according to ISO Base Media File Format (e.g., ISOBMFF, ISO/IEC 14496-12, ISO/IEC 14496-15 or ISO/IEC 23008-12 standards). The media file or the plurality of media files may correspond to one single media file (prefixed by a FileTypeBox 'ftyp' box) or to one initialization segment file (prefixed by a FileTypeBox 'ftyp' box) followed by one or more media segment files (possibly prefixed by a SegmentTypeBox 'styp' box). According to ISOBMFF, the media file (and segment files when present) may include two kinds of boxes: "media data" boxes ('mdat' or 'imda') containing the encoded media data and "metadata boxes" ('moov' or 'moof' or 'meta' box hierarchy) containing the metadata defining placement and timing of the encoded media data.

Encoder or decoder modules, referenced respectively 120 and 180 in FIG. 1, encodes and decodes image or video content using an image or video standard. For instance, Image or Video coding/decoding (codecs) standards include ITU-T H.261, ISO/IEC MPEG-1 Visual, ITU-T H.262 (ISO/IEC MPEG-2 Visual), ITU-T H.263 (ISO/IEC MPEG-4 Visual), ITU-T H.264 (ISO/IEC MPEG-4 AVC), including its scalable video coding (SVC) and multi-view video coding (MVC) extensions, ITU-T H.265 (HEVC), including its scalable (SHVC) and multi-view (MV-HEVC) extensions or ITU-T H.VVC (ISO/IEC MPEG-I Versatile Video Coding (VVC)). The techniques and systems described herein may also be applicable to other coding standards already available or not yet available or developed.

Figure 2B:
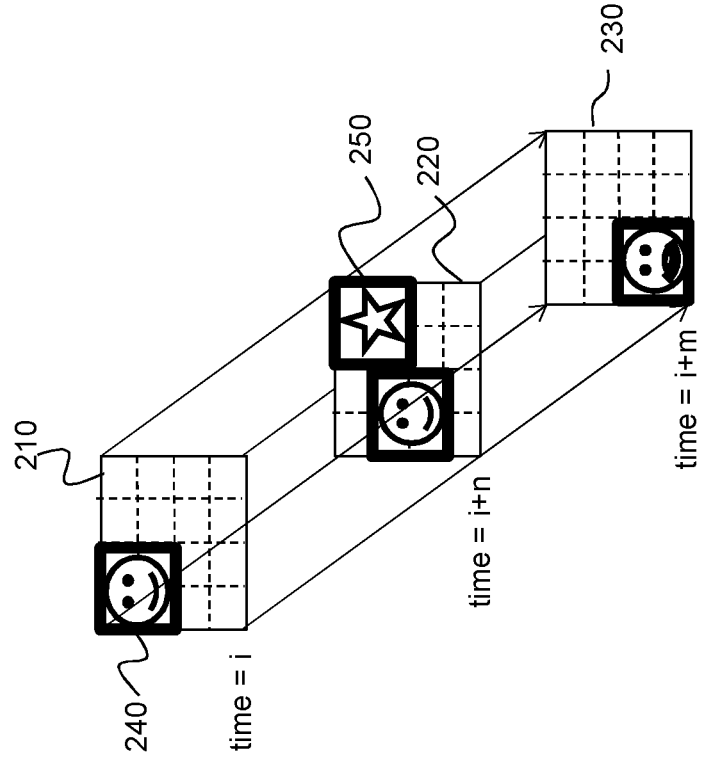
FIG. 2b illustrates an example of moving objects or regions into a sequence of images.
Figure 2A:
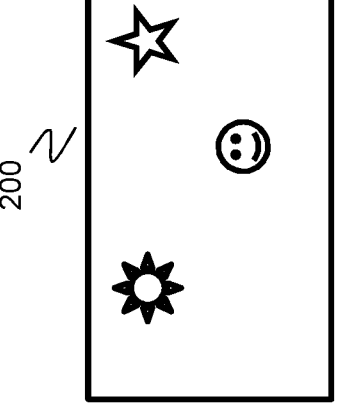
FIG. 2a illustrates an example of objects detected inside an image.

FIG. 2a illustrates an example of objects detected inside an image. A detected object can be represented by one or more spatial regions of the image 200 described by a geometry including the position of the region in the image and the shape of the region. The geometry of the region can surround the detected object or cover only a part of the detected object. The shape can be a 2D or 3D shape depending on whether the image 200 is a 2D image or 3D image or volumetric image. For instance, 2D shapes can be represented by a point, a polyline, a rectangle, an ellipse, a circle, a polygon or any arbitrary shapes defined by another image used as a mask over the image 200. As another example, 3D shapes can be represented by a 3D point, a 3D polyline, a cuboid, an ellipsoid, a sphere, a point cloud or a 3D mesh. Each region may be associated with one annotation or a plurality of annotations. Annotations can be metadata such as human-readable or computer-readable metadata, images, image sequences, samples of a video or audio or a whole video or audio bitstream).

FIG. 2b illustrates an example of moving objects or regions into a sequence of images. A first moving object or region 240 is detected in images 210, 220 and 230 and a second moving object or region 250 appears on image 220 and disappears later on in image 230. Regions may appear or disappear at any time along the sequence of images. The geometry (position and/or shape) of a region can be constant or can change over time to follow an object displacement in images. Similarly, annotations associated with a region can change over time to follow a change in properties of the object (e.g., a same detected face may change over time from a smiling face to a sad face), or when the annotation is an image associated with the region, the associated image can change over time.

Figure 3:
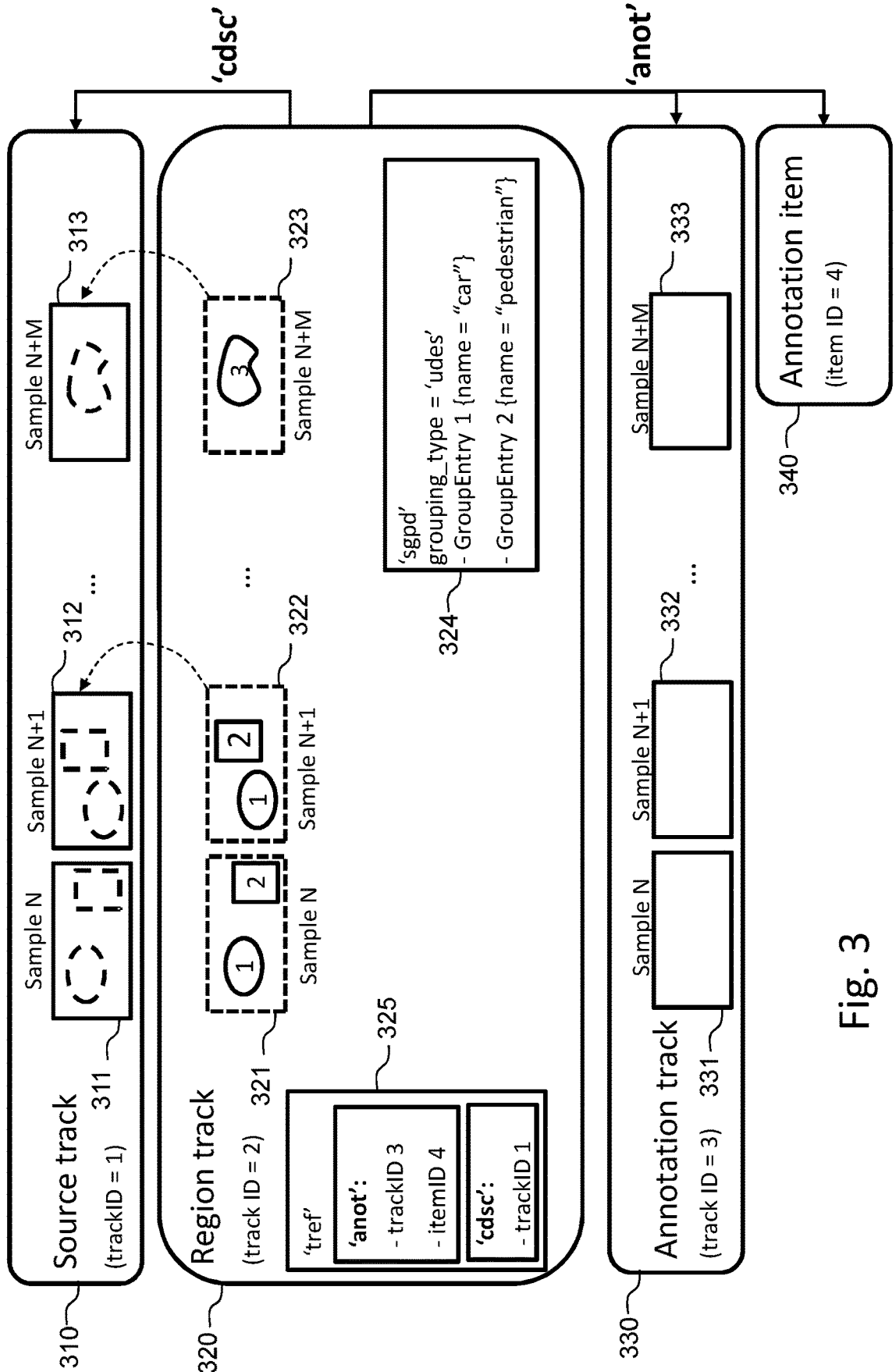
FIG. 3 illustrates an example of a presentation comprising a description of regions encapsulated within a media file, wherein the mapping between a region and its associated annotations is carried in samples of a region track according to some embodiments of the invention.

FIG. 3 illustrates an example of a presentation comprising a description of regions encapsulated within a media file, wherein the mapping between a region and its associated annotations is carried in samples of a region track according to some embodiments of the invention.

A media data comprising a timed sequence of images or video frames is encapsulated in a source track 310, each timed unit of the timed sequence being encapsulated in a sample (311, 312, 313) of the source track 310. For instance, the source track can be a video track (e.g., a track comprising a handler box with the handler type 'vide') or an image sequence track (e.g., a track comprising a handler box with the handler type 'pict'). Some of the samples 311, 312, 313 may have regions to be annotated. The regions may be detected by an image analysis algorithm or selected by a user. The geometries, i.e., the positions and/or shapes, of the regions in the samples 311, 312 and 313 of the source track 310 are described in a region track 320, which is a metadata track, e.g., a track comprising a handler box with the handler type 'meta'.

The metadata track 320 comprises a sample entry with the coding name 'rgan'. The metadata track 320 is a region track whose samples define one or more regions inside images carried in samples of an associated image sequence or video track, also denoted source track in the following.

The region track 320 is associated with the source track 310 comprising the samples inside which the regions are defined using a track reference of type 'cdsc' from the region track to the source track.

The region track 320 illustrated in FIG. 3 comprises a sample 321 describing two regions with the region identifiers 1 and 2. These regions are moving between consecutive samples. For instance, the positions and possibly shapes of regions 1 and 2 are different in sample 322. Later on in time, these regions with the region identifiers 1 and 2 have disappeared and a new region has appeared with a region identifier 3 in sample 323.

The region track 320 allows associating an annotation, also denoted region annotation in the following, with each region it defines inside a sample of the associated source track 310. A region annotation may be an item 340, e.g., an image item or a metadata item, another track 330, or samples 331, 332, 333 of another track 330, a SampleGroupDescriptionEntry from an SampleGroupDescriptionBox 324 or an item property (not illustrated). The another track 330 can be a metadata track, a video track, an audio track, a volumetric visual track or an image sequence track. The SampleGroupDescriptionBox 324 may have any value of grouping_type, the grouping_type indicating the type of properties described by SampleGroupDescriptionEntry.

Each region in a sample 321, 322, 323 of a region track 320 is associated with a region identifier. The same region identifier across consecutive samples may be used to identify the same moving region across the consecutive samples.

An item property or a SampleGroupDescriptionEntry may only be associated with a region defined by a region track when the property value for the region differs from the matching property value, explicit or implicit, for the whole sample of the associated source track. For instance, this means that if a sample 311 of the source track 310 is associated with a first property through a sample group with a given grouping_type and a region of this sample 311 described in the sample 321 of the region track 320 is associated with a second property of a sample group with the same given grouping_type then the second property overrides the first property for the area of the sample 311 represented by the region.

The geometries of the regions described in the region track 320 are specified in the data of the samples 321, 322, 323 of the region track 320. It is expected that the samples 321, 322, 323 of the region track 320 match the presentation time of the samples 311, 312, 313, respectively, in the referenced source track 310, i.e., samples of both tracks are time-aligned in the media presentation timeline.

These geometries define the shape, position and size of the regions inside a reference space that is mapped to the samples 311, 312, 313 of the source track 310 with which the region track 320 is associated after any transformation defined in the source track is applied to the samples of the source track.

The geometry of a region inside the sample of the associated source track is obtained after applying the implicit resampling caused by the difference between the size of the reference space and the size of the sample of the associated source track.

The geometry of a region described by the samples 321, 322, 323 of the region track 320 can be represented, for instance, by:

a point
a polyline
a rectangle
an ellipse
a polygon
a mask stored in the sample of another track or in an image item
a mask defined in the data of the sample.

The sample entry describing the samples of the region track 320 may be defined as follows:

Sample Entry Types: 'rgan'
Container: Sample Table Box ('stbl')
Mandatory: Yes
Quantity: One or more sample entries may be present
aligned(8) class RegionTrackConfigBox ( ) extends Full-
    Box ('rgaC', version=0, flags=0) {
    unsigned int (7) reserved=0;
    unsigned int (1) field_length_size;
    unsigned    int((field_length_size+1)*16)    reference_
        width;
    unsigned    int((field_length_size+1)*16)    reference_
        height;
}
aligned(8) class RegionSampleEntry
extends MetadataSampleEntry ('rgan') {
    RegionTrackConfigBox config; //mandatory
}
where
field_length_size indicates the length in bytes of various
    fields. The value equal to 0 specifies that the length of
    a field is 16 bits. The value equal to 1 specifies that the
    length of a field is 32 bits.
reference_width, reference_height specify, in pixel units,
    the width and height, respectively, of the reference
    space inside which the regions are placed.

The sample entry RegionSampleEntry documents the reference space inside which regions are defined. The reference space is defined as a 2D coordinate system with the origin (0,0) located at the top-left corner and a maximum size defined by reference_width and reference_height; the x-axis is oriented from left to right and the y-axis from top to bottom.

The body or format of the samples 321, 322, 323 may define one or more regions and is defined as follows:

```
aligned (8) class RegionSample {
    unsigned        int        field_size        =
((RegionTrackConfigBox.field_length_size & 1) + 1) * 16; // this
is a temporary, non-parsable variable
    unsigned int (7) reserved;
    unsigned int (1) interpolate;
    unsigned int (16) region_count;
    for (r=0; r < region_count; r++) {
        unsigned int (32) region_identifier;
        unsigned int (8) geometry_type;
        if (geometry_type == 0) {
            // point
            signed int (field_size) x;
            signed int (field_size) y;
        }
        else if (geometry_type == 1) {
            // rectangle
            signed int (field_size) x;
            signed int (field_size) y;
            unsigned int (field_size) width;
            unsigned int (field_size) height;
        }
        else if (geometry_type == 2) {
            // ellipse
            signed int (field_size) x;
            signed int (field_size) y;
            unsigned int (field_size) radius_x;
            unsigned int (field_size) radius_y;
        }
        else if (geometry_type == 3 | | geometry_type ==
6) {
            // polygon or polyline
            unsigned int (field size) point count;
            for (i=0; i < point_count; i++) {
                signed int (field_size) px;
                signed int (field_size) py;
            }
        }
        else if (geometry_type == 4) {
            // referenced mask
            signed int (field_size) x;
            signed int (field_size) y;
            unsigned int (field_size) width;
            unsigned int (field_size) height;
            unsigned int (field_size) track_mask_idx;
        }
        else if (geometry_type == 5) {
            // inline mask
            signed int (field_size) x;
            signed int (field_size) y;
            unsigned int (field_size) width;
            unsigned int (field_size) height;
            unsigned int (8) mask_coding_method;
            if (mask_coding_method != 0)
                unsigned                int (32)
mask_coding_parameters;
            bit (8) data [ ];
        }
        unsigned int (16) association_count;
        for (i=0; i<association_count; i++) {
            unsigned int (5) reserved;
            unsigned int (3) annotation_container_type;
            unsigned int (32) annotation_reference_type;
            unsigned int (32) annotation_idx;
        }
    }
}
``` where
interpolate indicates the continuity in time of the successive samples. When true, the application may linearly interpolate values of the region geometries between the previous sample and the current sample. When false, there shall not be any interpolation of values between the previous and the current samples.

It can be noted that when using interpolation, it is expected that the interpolated samples match the presentation time of the samples in the referenced source track. For instance, for each video sample of a video track, one interpolated region sample is calculated.

region_count specifies the number of regions defined in the sample.

region_identifier specifies the identifier of the region.

geometry_type specifies the type of the geometry of a region. For instance, the following values for geometry_type are defined:

0: the region is described as a point.

1: the region is described as a rectangle.

2: the region is described as an ellipse.

3: the region is described as a polygon.

4: the region is described as a mask defined in a referenced image item or in a sample of a referenced track.

5: the region is described as a mask defined inside the data of this sample.

6: the region is described as a polyline.

Other values are reserved.

x, y specify the coordinates of the point composing the region relatively to the reference space when its geometry is a point. x, y specify the top, left corner of the region relatively to the reference space when its geometry is a rectangle or a mask. x, y specify the centre of the region relatively to the reference space when its geometry is an ellipse. The value (x=0, y=0) represents the position of the top-left pixel in the reference space.

It can be noted that negative values for the x or y fields enable to specify points, top-left corners, and/or centres that are outside the image. This can be useful for updating region annotations during edition.

width, height specify, relatively to the reference space, the width and the height of the region when its geometry is a rectangle or a mask. When geometry_type equals 4, the value 0 indicates that the corresponding width or height value is provided by the ImageSpatialExtentsProperty associated with the item containing the mask or the width or height of the track containing the mask. When geometry_type does not equal 4, the value 0 is reserved.

radius_x specifies, relatively to the reference space, the radius on the x-axis of the region when its geometry is an ellipse.

radius_y specifies, relatively to the reference space, the radius on the y-axis of the region when its geometry is an ellipse.

point_count is the number of points contained in a polygon or a polyline.

It can be noted that a polygon specifying the geometry of a region is always closed and therefore there is no need to repeat the first point of the polygon as the ending point of the polygon.

px, py specify the coordinates of the points composing the polygon or the polyline relatively to the reference space. The value (px=0, py=0) represents the position of the top-left pixel in the reference space.

track_mask_idx specifies the index of the track reference of type 'mask' referring to the track from which to retrieve the mask to apply. The sample in that track from which mask data is retrieved is the one that is temporally aligned with the current sample in the source track or the nearest preceding one in the media presentation timeline. The first track reference has the index value 1; the value 0 is reserved. In a variant, the sample in that track from which mask data is retrieved is the one that is temporally aligned with the current sample in the region track or the nearest preceding one in the media presentation timeline.

mask_coding_method indicates the coding method applied on the mask contained in data. For instance, the following values are defined:

0: No mask encoding scheme is applied.

1: Mask is compressed with deflate( ) as defined in IETF RFC 1951.

Other values are reserved.

mask_coding_parameters indicates additional encoding parameters needed for successfully processing the coded mask data. When mask_coding_method is equal to 1, mask_coding_parameters indicates the number of bytes in the coded mask array data. The value of mask_coding_parameters is reserved when the value of mask_coding_method is greater than 1.

data contains the coded or uncompressed representation of a mask that contains the pixels for an inline mask in raster-scan order. Each pixel is represented using a single bit and 8 pixels are packed in one byte. Byte packing is in big-endian order. In a variant the byte packing is in little-endian order. No padding is put at the end of each line if the width of the mask is not a multiple of 8 pixels. Only the last data byte is padded with bits set to 0. In a variant, a padding with bits set to 0 is put at the end of each line if the width of the mask is not a multiple of 8 pixels.

In order to associate a set of annotations with each region defined in the sample of the region track, the body of the region track's samples (defined by the structure Region-Sample above) comprises for each region a list providing the mapping between the region identifier (region_identifier) and the associated annotations.

annotation_count specifies the number of annotations associated with the region.

annotation_reference_type specifies the four-character code type of the container carrying the annotation depending on the annotation_container_type value. If the value of annotation_container_type indicates a track, an item or a track group, it specifies the reference_type (i.e., the four-character code) of the TrackReferenceTypeBox in the TrackReferenceBox 325 containing the identifier of the entity (e.g., track 330, item 340, track group) containing the annotation associated with the region. If the value of annotation_container_type indicates a sample group, it specifies the grouping_type of the SampleGroupDescriptionBox containing the annotation associated with the region or is undefined.

annotation_idx specifies the index to retrieve the container carrying the annotation depending on the annotation_container_type value. If the value of annotation_container_type indicates a track, an item or a track group, it specifies the index of the track reference of type annotation_reference_type identifying the track, item or track group from which to retrieve the annotation associated with the region. If the value of annotation_container_type indicates a sample group, it specifies the index of the SampleGroupDescriptionEntry in the SampleGroupDescriptionBox 324 with grouping_type equals to annotation_reference_type from which to retrieve the annotation associated with the region.

annotation_container_type specifies the type of container carrying the annotation of the region. For instance, the following values for annotation_container_type may be defined:

0: the annotation is carried in samples of the annotation track identified by annotation_reference_type and annotation_idx in the track reference box. The sample in that annotation track temporally aligned, or nearest preceding in the media presentation timeline, comprises the annotation (e.g., image, metadata) applying to the corresponding sample of the source track referenced by the region track with a track reference 'cdsc'. In a variant, the sample in that annotation track temporally aligned, or nearest preceding in the media presentation timeline, comprise the annotation (e.g., image, metadata) applying to the corresponding sample of the region track 1: the annotation is the track, as a whole, identified by annotation_reference_type and annotation_idx in the track reference box.

2: the annotation is the item identified by annotation_reference_type and annotation_idx in the track reference box.

3: the annotation is the SampleGroupDescriptionEntry corresponding to the index annotation_idx in the SampleGroupDescriptionBox 'sgpd' with grouping type annotation_reference_type (for instance, the SampleGroupDescriptionBox 324 with a grouping type 'udes' illustrated in FIG. 3).

4: the annotation is the ItemProperty or ItemFullProperty corresponding to the index annotation_idx in the ItemPropertyContainerBox 'ipco' of the ItemPropertiesBox 'iprp' contained in the file-level Meta Box (not illustrated).

5: the annotation is the track group identified by annotation_reference_type and annotation_idx in the track reference box. Each track, as a whole, of the track group represents an annotation associated with the region.

6: the annotation is the track group identified by annotation_reference_type and annotation_idx in the track reference box. The samples, in each track of the track group, temporally aligned, or nearest preceding in the media presentation timeline, comprise the annotations (e.g., image, metadata) applying to the corresponding sample of the region track.

7: reserved.

In ISOBMFF, it is possible to have a unified handling of identifiers, i.e., identifiers of tracks, items, track groups and entity groups share the same identifiers space and a given identifier identifies at most one of those (or nothing at all).

In a variant, when there is a unified handling of identifiers (possibly signalled in the media file by the brand 'unif')), the same value of annotation_container_type can be used to identify either a track, an item or a track group (corresponding to the cases where annotation_container_type equals 0, 2 or 5 above, respectively).

In another variant, annotation_container_type is an optional parameter. When absent and when there is a unified handling of identifiers (possibly signalled in the media file by the brand 'unif')) the annotation_idx can reference either a track, an item or a track group (corresponding to the cases where annotation_container_type equals 0, 2 or 5 above, respectively). In this variant, when there is a unified handling of identifiers, the annotation_reference_type may be used to differentiate annotations carried in a sample group from annotations carried in either a track, an item or a track group. For example, when annotation_reference_type is equal to the four-character code 'anot' (or any other available four-character code), it indicates that the annotation_idx can reference either a track, an item or a track group; and, when annotation_reference_type is equal to another four-character code, it indicates that the annotation_idx is the index of the SampleGroupDescriptionEntry in the SampleGroupDescriptionBox with grouping_type equals to annotation_reference_type. When annotation_reference_type is absent, its default value can be set to 'anot'.

In another variant, annotation_reference_type is an optional parameter. When absent, a default value is used (e.g., 'anot' or any other available four-character code).

In another variant, that can be combined with other variants, the body or format of the samples 321, 322, 323 may define one or more regions and is defined as follows:

```
aligned (8) class RegionSample {
    unsigned          int          field_size          =
((RegionTrackConfigBox.field_length_size & 1) + 1) * 16; // this
is a temporary, non-parsable variable
        unsigned int (7) reserved;
        unsigned int (1) interpolate;
        unsigned int (16) region_count;
        for (r=0; r < region_count; r++) {
            unsigned int (32) region_identifier;
            unsigned int (8) geometry_type;
            if (geometry_type == XXX) {
                // either point, rectangle, ellipse,
polygon, polyline, referenced mask or inline mask as described
above
                (...)
            }
        }
        unsigned int (16) region_id_count;
        for (r=0; r < region_id_count; r++) {
        unsigned int (32) region_identifier;
        unsigned int (16) association_count;
        for (i=0; i<association_count; i++) {
            unsigned int (5) reserved;
            unsigned int (3) annotation_container_type;
            unsigned int (32) annotation_reference_type;
            unsigned int (32) annotation_idx;
        }
        }
    }
```

Where the loop based on region_count providing the number of regions and their geometries in the sample and the loop based on region_id_count providing the mapping between each of the region identifiers and a set of annotations are two different loops.

In this variant, region_count specifies the number of regions defined in the sample and region_id_count specifies the number of distinct region identifiers. A value of region_identifier region_identifier appears at most once in the loop on region_id_count and may appear several times in the loop on region_count.

Other parameters have the same semantics as previously.

Different regions in a same sample may have the same region identifier. When multiple regions in the same sample have the same region identifier, this indicates that each of these regions is associated with the same region annotations or set of region annotations. When multiple regions in consecutive samples have the same region identifier, this may indicate, but not necessarily, that each of these regions is associated with the same region annotations or set of region annotations. This means that the region identifier may be used for associating one or several regions in a sample or may be used for associating one or several regions across consecutive samples with corresponding region annotations or set of region annotations, the association being made at the sample level.

Line segments for both polygons and polylines do not cross (including the implicit closing line for polygons).

The pixels of the sample of the associated source track that are part of a region depend on the geometry of the region as follows:

When the geometry of a region is represented by a point, the pixel located at this point, if it exists, is part of the region.

When the geometry of a region is represented by a rectangle, an ellipse, or a polygon, the pixels that are inside (including the boundary) of the rectangle, ellipse, or polygon are part of the region.

When the geometry of a region is represented as a mask defined in the data of the sample of the region track (i.e., when geometry_type equals 5), the pixels of the sample of the associated source track corresponding to pixels with the value 1 in the mask image are part of the region.

When the geometry of a region is represented by a polyline, the pixels that would be coloured if a one-pixel-wide line were drawn along the polyline (even minimally) are part of the region.

When the geometry of a region is represented by a mask stored in the sample of another track or in an image item (both not illustrated in FIG. 3) (i.e., when geometry_type equals 4), the image item or the sample containing the mask is the time-aligned sample of the track identified by a track reference of type 'mask' from the region track to the track or image item containing the mask. For instance, the track or image item containing the mask is one of the following:

A mask as defined in ISO/IEC 23008-12 clause 6.10.2 in a mask item or samples of a track.

An image item or a track that is encoded in monochrome format (i.e. 4:0:0 chroma format).

An image item or a track that is encoded in colour. In such a case, it is encoded in a colour format with a luma plane and chroma planes (e.g. as 4:2:0 YCbCr). Since only the luma plane is relevant, the chroma planes should be ignored.

A region may be empty if it falls entirely outside the image carried in a sample. An empty region should be ignored.

The mask contained in a sample of another track or in an image item applies to a region after performing the implicit resampling caused by the difference between the size of the region documented by width and height and the size of the sample or image item containing the mask.

When the mask is stored as an image item or as a sample of a track, transformation associated with the image item or track may apply to the mask before it is used to define the geometry of a region inside the referenced image item.

The following semantics apply to a mask stored as a mask item, image item or sample of another track:

the maximum pixel value (e.g. 255 for 8-bit pixel values) in the mask image means that the corresponding pixel in the sample of the associated track is part of the region;

the minimum pixel value (i.e. 0) in the mask image means that the corresponding pixel in the sample of the associated track is not part of the region;

other pixel values (e.g. 1 to 254 for 8-bit sample values) is representative of a probability that the corresponding pixel in the sample of the associated track is part of the region. Higher pixel values represent higher probability values.

It can be noted that the term "pixel value" used above is to be interpreted as "luma-component value of the pixel" if the mask is stored as an image item or as a sample encoded with separate luma and chroma planes.

It can also be noted that non-zero mask pixel values can have application-dependent semantics. For example, they can represent confidence scores for each pixel of an AI-generated mask, or saliency score indication per pixel in the defined region.

An alpha plane auxiliary track or image item may be referenced as a mask by a region track. In such case, the reference space size should be equal to the alpha plane size and the coordinates (x, y) of the region should be (0, 0).

In a variant, when the source track is carrying a 3D or volumetric media, a 3D region track is created to describe 3D regions. The 3D region track is a metadata track comprising a sample entry with the coding name '3drg' or any other available four-character code.

According to this variant, a Vector3 class is defined as follows:

```
aligned(8) class Vector3 (unsigned int precision_bytes_
    minus1) {
    signed int((precision_bytes_minus1+1)*8) x;
    signed int((precision_bytes_minus1+1)*8) y;
    signed int((precision_bytes_minus1+1)*8) z;
}
``` where precision_bytes_minus1 plus 1 specifies the precision of Vector3 components in bytes.

x, y and z: specify the x, y, and z coordinate values, respectively, of a 3D information in the Cartesian coordinate system. The 3D information specified by x, y, and z can be 3d positions, offsets, dimensions, translations or scaling depending on its usage.

The sample entry of the 3D region track is defined as follows:

Sample Entry Types: '3drg'

Container: Sample Table Box ('stbl')

Mandatory: Yes

Quantity: One or more sample entries may be present

```
aligned(8) class 3dRegionTrackConfigBox( ) extends
    FullBox ('3dgC', version=0, flags=0) {
    unsigned int (6) reserved=0;
    unsigned int (2) precision;
    Vector3 (precision) reference_space;
}
aligned(8) class 3dRegionSampleEntry
extends MetadataSampleEntry ('3drg') {
    3dRegionTrackConfigBox config; //mandatory
}
``` where precision indicates the length in bytes of various fields. The value equal to 0 specifies that the length of a field is 8 bits. The value equal to 1 specifies that the length of a field is 16 bits. The value equal to 2 specifies that the length of a field is 24 bits. The value equal to 3 specifies that the length of a field is 24 bits.

reference_space.x, reference_space.y, reference_space.z specify, in pixel units, the size of the 3D spatial region in the Cartesian coordinates along the x, y, and z axes, respectively, of the reference space on which the 3D regions are placed.

The sample entry 3dRegionSampleEntry documents the reference space inside which 3D regions are defined. The reference space is defined as a 3D coordinate system with the origin (0,0,0) located at the top-left-back corner and a maximum size defined by reference_space.x and reference_space.y and reference_space.z. The x-axis is oriented from left to right, the y-axis from top to bottom and the z-axis from back to front.

As for the samples of the 2D region track, the samples of the 3D region track may define one or more regions that can be described by a 3D point, a cuboid, an ellipsoid, a sphere, a cylinder or any other 3D shapes or point cloud. Interpolation and association of a 3D region with an annotation can be described as for the 2D region track described above. For example, the body or format of the samples 321, 322, 323 may define one or more 3D regions as defined below:

```
aligned (8) class 3DRegionSample {
    unsigned int (7) reserved;
    unsigned int (1) interpolate;
    unsigned int (16) region_count;
    for (r=0; r < region_count; r++) {
        unsigned int (32) region_identifier;
        unsigned int (8) geometry_type;
        if (geometry_type == 0) {
            // 3Dpoint
            Vector3
3dpoint (3dRegionTrackConfigBox.precision);
        }
        else if (geometry_type == 1) {
            // rectangle
            CuboidRegion            3dRectangle (1,
3dRegionTrackConfigBox.precision);
            QuaternionRotation rotation ();
        }
        else if (geometry_type == XXX) {
            // any other 3d shape, e.g. ellipsoid, a
sphere, a cylinder...
        }
        unsigned int (16) association_count;
        for (i=0; i<association_count; i++) {
            unsigned int (5) reserved;
            unsigned int (3) annotation_container_type;
            unsigned int (32) annotation_reference_type;
            unsigned int (32) annotation_idx;
        }
    }
}
Where CuboidRegion can be defined as follows:
aligned (8) class CuboidRegion (
    unsigned int (1) anchor_included,
    unsigned int (8) precision)
{
    if (anchor_included) {
        Vector3 anchor (precision);
    }
    Vector3 dimension (precision);
}
```

Where anchor.x, anchor.y and anchor.z specify the anchor point of the cuboid region relatively to the reference space along the x, y, and z axes, respectively.

dimension.x, dimension.y and dimension.z specify the size of the cuboid region relatively to the reference space along the x, y, and z axes, respectively, relative to the anchor point. It indicates the width, height, and depth of the cuboid region, respectively. And where QuaternionRotation can be defined as follows:

```
aligned(8) class QuaternionRotation ( ) {
    signed int (32) quat_x;
    signed int (32) quat_y;
    signed int (32) quat_z;
}
```

Where quat_x, quat_y, and quat_z, indicate the x, y, and z components, respectively, of the rotation using the quaternion representation. The values shall be in the range of $-2^{30}$ to $2^{30}$, inclusive. When the component of rotation is not present, its value shall be inferred to be equal to 0. The value of rotation components may be calculated as follows:

$$qX=\text{quat\_x}\div2^{30},\ qY=\text{quat\_y}\div2^{30},\ qZ=\text{quat\_z}\div2^{30}$$

The fourth component, qW, for the rotation using the quaternion representation is calculated as follows:

$$qW=\text{Sqrt}(1-(qx^2+qY^2+qZ^2))$$

The point (w, x, y, z) represents a rotation around the axis directed by the vector (x, y, z) by an angle $2*\cos\hat{}\{-1\}(w)=2*\sin\hat{}\{-1\}(\text{sqrt}(x\hat{}\{2\}+y\hat{}\{2\}+z\hat{}\{2\}))$.

It can be noted that, as aligned with ISO/IEC FDIS 23090-5, qW is always positive. If a negative qW is desired, one can signal all three syntax elements, quat_x, quat_y, and quat_z with an opposite sign, which is equivalent.

In embodiments described above, the mapping between a region identifier and an associated annotation or a plurality of annotations is repeated in each sample of the region track. It is very likely that the same object and the corresponding region is present in a plurality of consecutive samples. While the geometry of this region is likely to change for each sample, in particular the position of the region and possibly its shape, the mapping between the region identifier and the list of associated annotations is more likely to be constant over consecutive samples. It would therefore be useful to avoid repeating this mapping in each sample.

Figure 4:
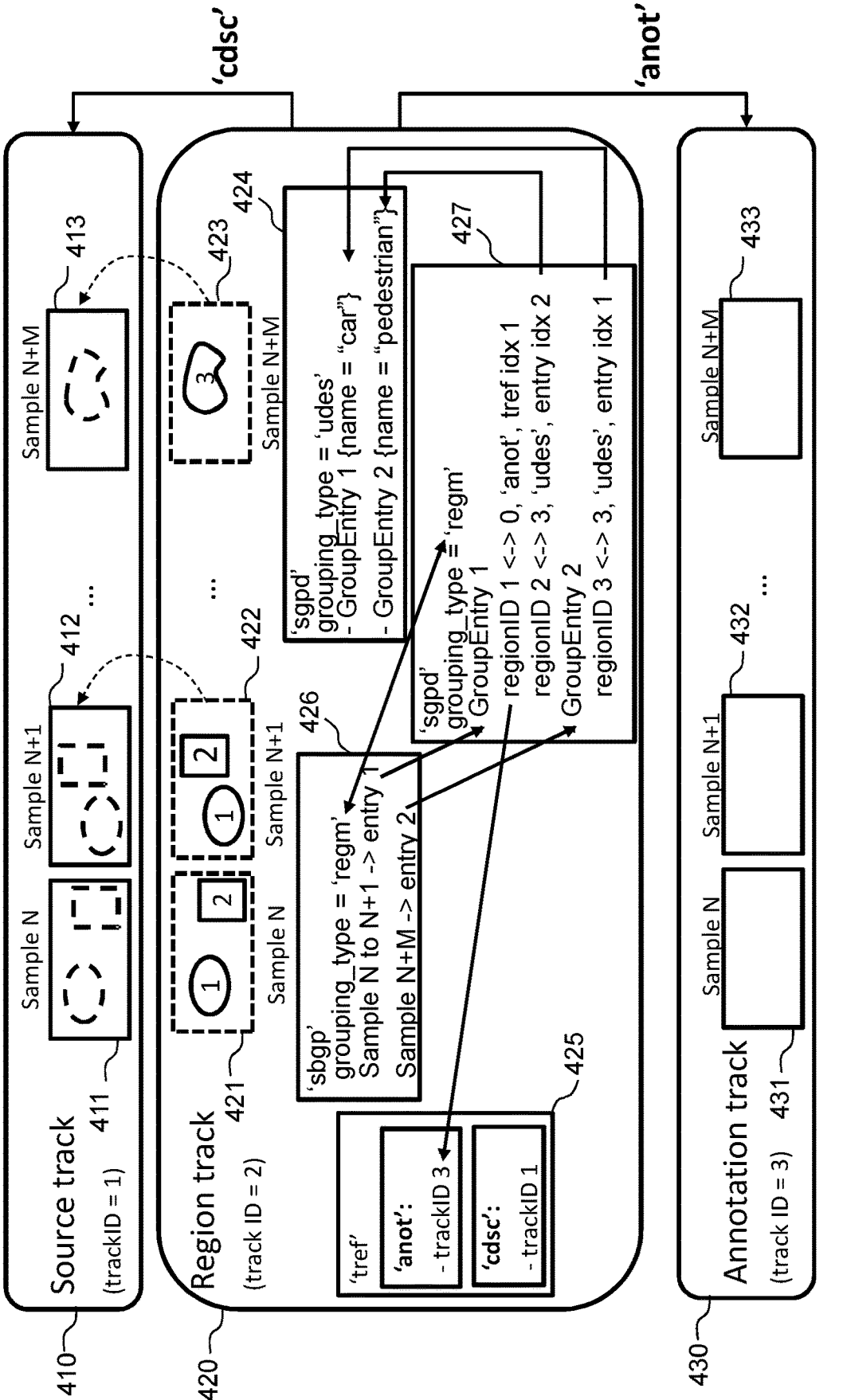
FIG. 4 illustrates an example of a presentation comprising a description of regions encapsulated within a media file, wherein the mapping between a region and its associated annotations is mutualized over consecutives samples in a region track according to some embodiments of the invention.

FIG. 4 illustrates an example of a presentation comprising a description of regions encapsulated within a media file, wherein the mapping between a region and its associated annotations is mutualized over consecutives samples according to some embodiments of the invention.

In a similar way to the embodiment illustrated by FIG. 3, the media data to be annotated is encapsulated in a source track 410, each timed unit of the media data being encapsulated in a sample (411, 412, 413) of the source track 410.

Geometries (position and/or shape) of the regions in the samples 411, 412 and 413 of the source track 410 are described in a metadata track or region track 420 (e.g., a track comprising a handler box with the handler type 'meta').

The definition and semantics of this region track and its sample entry are the same as for the embodiment illustrated by FIG. 3 except that the mapping between a region identifier and the set of associated annotations is not provided in samples 421, 422, 423 of the region track 420.

According to this embodiment, the body or format of the samples 421, 422, 423 may define one or more regions and is defined as follows:

```
aligned (8) class RegionSample {
    unsigned        int        field_size        =
    ((RegionTrackConfigBox. field length size & 1) + 1) * 16; // this
    is a temporary, non-parsable variable
        unsigned int (7) reserved;
        unsigned int (1) interpolate;
        unsigned int (16) region_count;
        for (r=0; r < region_count; r++) {
            unsigned int (32) region_identifier;
            unsigned int (8) geometry_type;
```

-continued

```
        if (geometry_type == 0) {
            // point
            signed int (field_size) x;
            signed int (field_size) y;
        }
        else if (geometry_type == 1) {
            // rectangle
            signed int (field_size) x;
            signed int (field_size) y;
            unsigned int (field_size) width;
            unsigned int (field_size) height;
        }
        else if (geometry_type == 2) {
            // ellipse
            signed int (field_size) x;
            signed int (field_size) y;
            unsigned int (field_size) radius_x;
            unsigned int (field_size) radius_y;
        }
        else if (geometry_type == 3 || geometry_type ==
6) {
            // polygon or polyline
            unsigned int (field size) point_count;
            for (i=0; i < point_count; i++) {
                signed int (field_size) px;
                signed int (field_size) py;
            }
        }
        else if (geometry_type == 4) {
            // referenced mask
            signed int (field_size) x;
            signed int (field_size) y;
            unsigned int (field_size) width;
            unsigned int (field_size) height;
            unsigned int (field_size) track_mask_idx;
        }
        else if (geometry_type == 5) {
            // inline mask
            signed int (field_size) x;
            signed int (field_size) y;
            unsigned int (field_size) width;
            unsigned int (field_size) height;
            unsigned int (8) mask_coding_method;
            if (mask_coding_method != 0)
                unsigned                        int (32)
mask_coding_parameters;
            bit (8) data [ ];
        }
    }
}
``` where the semantics of interpolate, region_identifier and all other parameters defined above are the same as for the embodiment illustrated by FIG. 3.

Each region in a sample 421, 422, 423 of a region track 420 is associated with a region identifier. Different regions in a same sample or in consecutive samples may have the same region identifier. When multiple regions in the same sample have the same region identifier, this indicates that each of these regions is associated with the same region annotations or set of region annotations. When multiple regions in consecutive samples have the same region identifier, this may indicate, but not necessarily, that each of these regions is associated with the same region annotations or set of region annotations. This means that the region identifier may be used for associating one or several regions in a sample or may be used for associating one or several regions across consecutive samples with corresponding region annotations or set of region annotations, the association being made at a sample group level as described hereafter.

According to this embodiment, the mapping between a region identifier defined in samples 421, 422 and 423 and an annotation track 430 or a SampleGroupDescriptionEntry of a SampleGroupDescriptionBox 424 or any other annotations (items, track groups or item properties not illustrated) is provided using a sample group with grouping_type 'regm' (or any other available four-character code) comprising a SampleGroupDescriptionBox 'sgpd' 427 with grouping_type 'regm' and optionally a SampleToGroupBox 'sbgp' 426 with the same grouping_type 'regm' that describes the assignment of each sample of the region track to a sample group and its associated sample group description provided by the SampleGroupDescriptionBox 427. When the optional SampleToGroupBox 'sbgp' 426 is not provided, it means that the SampleGroupDescriptionBox 'sgpd' 427 provides a single entry applying to all the samples (e.g., identified by the default_group_description_index parameter).

The 'regm' sample grouping provides a flexible way to associate regions inside the samples of a region track with region annotations. It provides the mapping between region identifiers in samples of the region track and region annotations carried in various types of containers: tracks, items, samples of a track, item properties, track groups, samples of a track group or sample group descriptions.

According to this embodiment, the 'regm' sample grouping should only be present in a region track, and may be ignored otherwise.

The SampleGroupDescriptionEntry of the SampleGroupDescriptionBox 427 providing the mapping region-to-annotation applying to one or more samples of the region track 420 is defined as follows:

```
class SampleToRegion IdMappingEntry ()
extends SampleGroupDescriptionEntry ('regm') {
    unsigned int (32) entry_count;
    for (i=1; i <= entry_count; i++) {
        unsigned int (32) regionID;
        unsigned int (16) association_count;
        for (i=0; i<association_count; i++) {
            unsigned int (5) reserved;
            unsigned int (3) annotation_container_type;
            unsigned int (32) annotation_reference_type;
            unsigned int (32) annotation_idx;
        }
    }
}
``` where entry_count is an integer that gives the number of entries in the mapping table, i.e., the number of regions in the mapping table.

regionID is an integer that specifies the identifier of the region.

annotation_count is an integer that specifies the number of annotations associated with the region.

annotation_reference_type, annotation_idx and annotation_container_type have the same semantics and variants as for the embodiment illustrated by the FIG. 3.

For example, as illustrated in FIG. 4, the samples 421 and 422 comprising two regions with identifiers 1 and 2 are associated with the first SampleGroupDescriptionEntry (i.e., a SampleToRegionIdMappingEntry) of the SampleGroupDescriptionBox 427. The corresponding SampleToRegionIdMappingEntry defines a mapping of the region with identifier 1 to the annotation encapsulated in a container of type "annotation_container_type=0", i.e., in a track actually identified by the track reference with the track reference type equals to "annotation_reference_type='anot'" in the track reference box 425 and the track reference index equals to "annotation_idx=1". In this example, this corresponds to the track 430 with trackID=3. In same SampleToRegionIdMappingEntry, the region with identifier 2 is mapped to an entry of a SampleGroupDescriptionBox (annotation_container_type=3) identified by the grouping_type equals to annotation_reference_type='udes'. This corresponds to the SampleGroupDescriptionBox 424. The entry mapped to the region with identifier 2 is the second entry of the SampleGroupDescriptionBox 424 (annotation_idx=2) meaning that the textual description "pedestrian" is actually the annotation associated with the region with identifier 2. In a similar way, the region with identifier 3 in the sample 423 is associated with the first entry of the SampleGroupDescriptionBox 424 corresponding to the textual description "car".

According to this embodiment, a region annotation consists in metadata or images or audio samples carried in image items, samples of metadata or video or audio track or track groups or item properties or properties from a sample group associated with one or more regions of an image carried in a sample of an image sequence or video track. A region annotation may be associated with one or more regions of a sample of an image sequence or video track by:

describing in a sample of a region track the geometry of these one or more regions;

associating the region track with the image sequence or video track it describes using the 'cdsc' (content describes) track reference from the region track to the image sequence or video track; and, associating tracks, track groups, or items carrying the region annotation with the region track using a track reference of type 'anot' from the region track to the image items, tracks or track groups, and/or defining the SampleGroupDescriptionBoxes containing the region annotation; and defining a 'regm' sample grouping in the region track providing the mapping between the region identifiers and the region annotations.

The region annotation applies to each region described in time-aligned sample of the region track individually.

According to this embodiment, it is therefore possible to reduce the description cost by mutualizing the mapping region-to-annotation when the number of regions and their corresponding identifiers are constant over multiple consecutive samples of the region track.

In a variant, two different sample groups are used to differentiate annotations associated via the track reference box from annotations associated via a SampleGroupDescriptionBox.

Accordingly, a sample group with grouping_type 'rmsg' is used to associate an annotation contained in a SampleGroupDescriptionEntry with the region. The corresponding SampleGroupEntryToRegionIdMappingEntry is defined as below:

```
class SampleGroupEntryToRegionIdMappingEntry ()
extends SampleGroupDescriptionEntry ('rmsg') {
    unsigned int (32) entry_count;
    for (i=1; i <= entry_count; i++) {
        unsigned int (32) regionID;
        unsigned int (16) association_count;
        for (i=0; i<association_count; i++) {
            unsigned int (32) annotation_reference_type;
            unsigned int (32) annotation_idx;
        }
    }
}
``` where entry_count, regionID, association_count have the same semantics as described previously.

The SampleGroupDescriptionEntry with grouping_type 'rmsg' indicates that the container is a SampleGroupDescriptionBox with the grouping_type equals to annotation_reference_type, and the annotation is the SampleGroupDescriptionEntry identified by the value of annotation_idx in this SampleGroupDescriptionBox.

Still according to this variant, a sample group with grouping_type 'rmtf' is used to associate an annotation contained in a track, in a sample of a track, an item or a track group with the region. The corresponding RegionMappingEntry is defined as below:

```
class RegionMappingEntry ()
extends SampleGroupDescriptionEntry ('rmtf') {
    unsigned int (32) entry_count;
    for (i=1; i <= entry_count; i++) {
        unsigned int (32) regionID;
        unsigned int (16) association_count;
        for (i=0; i<association_count; i++) {
            unsigned int (32) annotation_reference_type;
            unsigned int (32) annotation_idx;
        }
    }
}
``` where
    entry_count, regionID, association_count have the same semantics as described previously.

The SampleGroupDescriptionEntry with grouping_type 'rmtf' indicates that the container of the annotation is identified via the track reference box by the track reference of type annotation_reference_type and the index annotation_ idx. When there is a unified handling of identifiers (possibly signalled in the media file by the brand 'unif'), the index annotation_idx may refer to a track, an item or a track group.

In another variant, two different grouping_type ('rmsg' and 'rmtf'), as described above, are still used to differentiate annotations associated via the track reference box from annotations associated via a SampleGroupDescriptionBox and, in addition, the annotation_reference_type value is signalled by the grouping_type_parameter of the SampleToGroupBox (with grouping_type 'rmsg' or 'rmtf' respectively). Therefore, a different sample grouping is used per couple (grouping_type ('rmsg' or 'rmtf')) and grouping_type_parameter=annotation_reference_type). In this variant, the SampleGroupDescriptionEntry with grouping_type 'rmsg' or 'rmtf' is defined as follows:

```
class RegionMappingEntry ()
extends SampleGroupDescriptionEntry ('rmtf' or 'rmsg') {
    unsigned int (32) entry_count;
    for (i=1; i <= entry_count; i++) {
        unsigned int (32) regionID;
        unsigned int (16) association_count;
        for (i=0; i<association_count; i++) {
            unsigned int (32) annotation_idx;
        }
    }
}
``` where entry_count, regionID, association_count have the same semantics as described previously.

The SampleGroupDescriptionEntry with grouping_type 'rmtf' indicates that the container of the annotation is identified via the track reference box by the track reference of type grouping_type_parameter and the index annotation_ idx. When there is a unified handling of identifiers (possibly signalled in the media file by the brand 'unif'), the index annotation_idx may refer to a track, an item or a track group.

The SampleGroupDescriptionEntry with the grouping_type 'rmsg' indicates that the container is a SampleGroupDescriptionBox with the grouping_type equals to grouping_type_parameter, and the annotation is the SampleGroupDescriptionEntry identified by the value of annotation_idx in this SampleGroupDescriptionBox.

Figure 5:
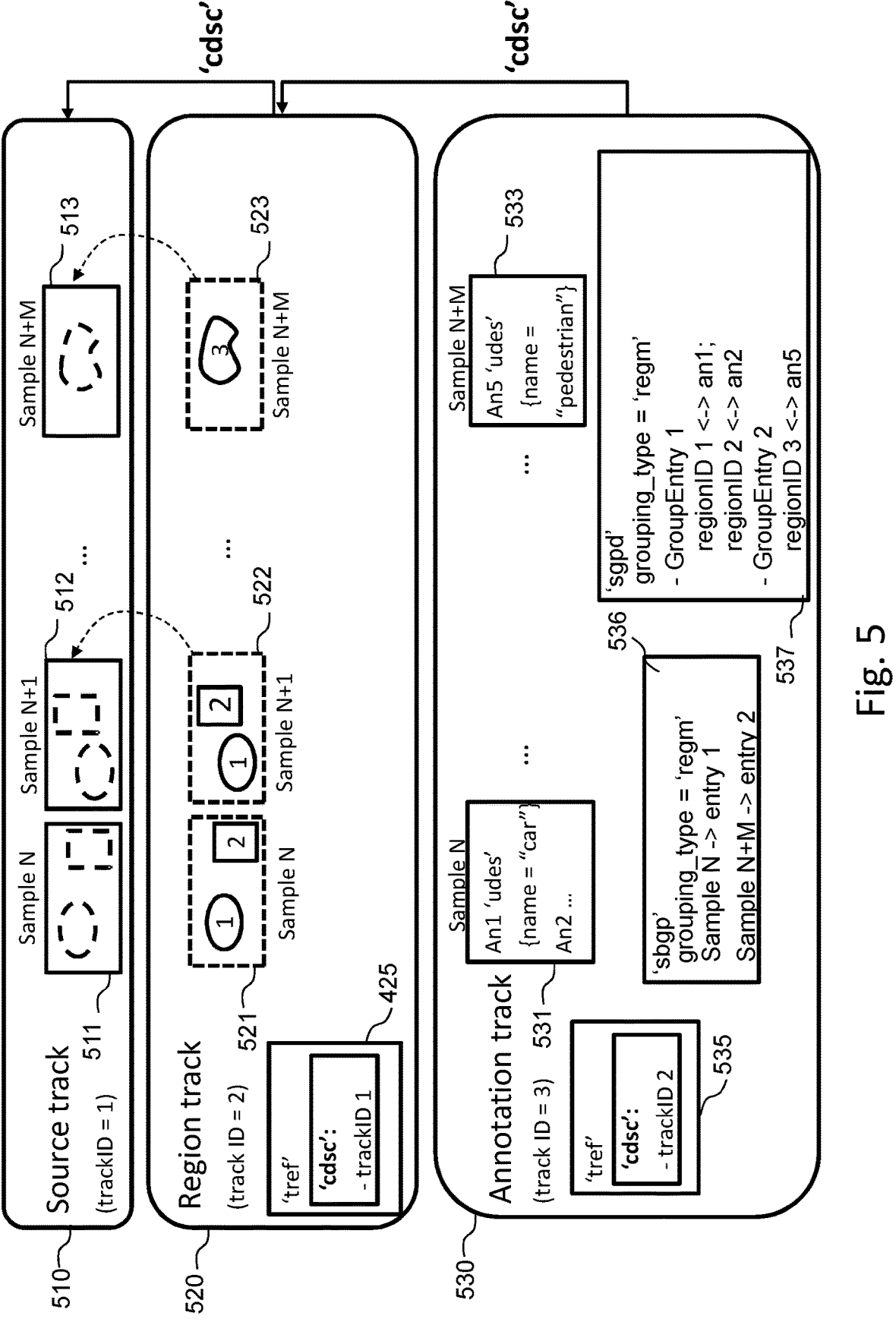
FIG. 5 illustrates an example of a presentation comprising a description of regions encapsulated within a media file, wherein the mapping between a region and its associated annotations is carried in an annotation track according to some embodiments of the invention.

FIG. 5 illustrates an example of a presentation comprising a description of regions encapsulated within a media file, wherein the mapping between a region and its associated annotations is carried in an annotation track according to some embodiments of the invention.

In a similar way to the embodiments illustrated by FIG. 3 and FIG. 4, the media data to be annotated is encapsulated in a source track 510, each timed unit of the media data being encapsulated in a sample (511, 512, 513) of the source track 510.

Geometries (position and/or shape) of the regions in the samples 511, 512 and 513 of the source track 510 are described in a metadata track or region track 520 (e.g., a track comprising a handler box with the handler type 'meta').

The definition and semantics of this region track 520 and its sample entry are the same as for the embodiment illustrated by FIG. 4 except that the mapping between a region identifier and the set of associated annotations is not provided in the region track 520. The region track is associated with the source track via a track reference of type 'cdsc' (via the TrackReferenceBox 425).

Annotations are carried in one or more annotation track 530 associated to the region track 520 via a track reference of type, e.g., 'cdsc' or 'anot' (via the TrackReferenceBox 535).

Within the annotation track 530, samples 531, 533 comprises one or more annotations, each annotation being explicitly identified by an identifier (illustrated 'An1', 'An2', 'An5' in FIG. 5) or being implicitly indexed in the order of declaration in a sample. The annotations can be described as a set of metadata in the samples 531, 533, by an image or set of images in samples 531, 533 or by a set of boxes (e.g., ItemProperty, ItemFullProperty or any other ISOBMFF boxes).

According to this embodiment, the mapping between the regions described in the samples 521 to 523 of the region track and the annotations described in the samples 531, 533 of the annotation track 530 is provided using a sample group with grouping_type 'regm' (or any other available four-character code) comprising a SampleGroupDescriptionBox 'sgpd' 537 with grouping_type 'regm' and optionally a SampleToGroupBox 'sbgp' 536 with the same grouping_type 'regm' that describes the assignment of each sample of the annotation track to a sample group and its associated sample group description provided by the SampleGroupDescriptionBox 537. When the optional SampleToGroupBox 'sbgp' 536 is not provided, it means that the SampleGroupDescriptionBox 'sgpd' 537 provides a single entry applying to all the samples (e.g., identified by the default_group_description_index parameter).

The SampleGroupDescriptionEntry of the SampleGroupDescriptionBox 427 providing the mapping region-to-annotation applying to a sample of the region track 420 may be defined as follows:

```
class SampleToRegionIdMappingEntry ()
extends SampleGroupDescriptionEntry ('regm') {
    unsigned int (32) entry_count;
    for (i=1; i <= entry_count; i++) {
        unsigned int (32) regionID;
        unsigned int (16) association_count;
        for (i=0; i<association_count; i++) {
            unsigned int (32) annotation_idx;
        }
    }
}
``` where entry_count is an integer that gives the number of entries in the mapping table, i.e., the number of regions in the mapping table.

regionID is an integer that specifies the identifier of the region.

annotation_count is an integer that specifies the number of annotations associated with the region.

annotation_idx is an integer that specifies the identifier of the annotation or the implicit index of the annotation in the sample.

A sample in the annotation track that is temporally aligned, or that is nearest preceding in the media presentation timeline apply to the corresponding sample of the region track, e.g., the same sample 531 applies to sample 521 et 522. In a variant, a sample in the annotation track that is temporally aligned, or that is nearest preceding in the media presentation timeline apply to the corresponding sample of the source track associated with the region track, e.g., the same sample 531 applies to sample 511 et 512.

By defining the mapping between regions and annotations in the annotation track, this eases the editing of the media file when new annotations are added to the file. Indeed, in such case, there is no need to modify an existing region track or the metadata describing the existing region track. Only defining and adding a new annotation track is needed.

In a variant, the mapping between the regions described in the samples 521 to 523 of the region track and the annotations described in the samples 531, 533 of the annotation track 530 is provided directly in the samples 531 and 533 with the annotations of the annotation track.

In another variant, the annotations are comprised in SampleGroupDescriptionEntry of one or more SampleGroupDescriptionBox and only the mapping between a region defined in the region track and a SampleGroupDescriptionEntry of the one or more SampleGroupDescriptionBox is defined in the samples 531 and 533 of the annotation track.

In this variant, the body or format of the samples 531 and 533 may be defined as follows:

```
aligned (8) class RegionToAnnotationMappingSample {
    unsigned int (16) region_count;
    for (r=0; r < region_count; r++) {
        unsigned int (32) region_identifier;
        unsigned int (16) association_count;
        for (i=0; i<association_count; i++) {
            unsigned int (32) annotation_reference_type;
            unsigned int (32) annotation_idx;
        }
    }
}
```

Where region_count specifies the number of regions defined in the sample.

region_identifier specifies the identifier of the region.

annotation_count specifies the number of annotations associated with the region.

annotation_reference_type specifies the grouping_type of the SampleGroupDescriptionBox containing the annotation associated with the region.

annotation_idx specifies the index of the SampleGroupDescriptionEntry in the SampleGroupDescriptionBox with grouping_type equals to annotation_reference_type from which to retrieve the annotation associated with the region.

Possibly, annotation_idx and annotation_reference_type may also be used to reference an annotation carried in an item, another track or track group via the track reference box 535. annotation_reference_type provides the type of track reference and annotation_idx provides the entry in track references of type annotation_reference_type providing the identifier of the track, item or track group carrying the annotation.

According to any embodiments described above, an annotation can be described by an item property. Item properties are usually stored in the ItemPropertyContainerBox 'ipco' of an ItemPropertiesBox 'iprp' of a MetaBox 'meta' defined at file or segment level or possibly at track-level. According to the invention, item properties may also a be contained in SampleGroupDescriptionEntry of a SampleGroupDescriptionBox with grouping_type 'ipsg' (or any other available four-character code), this SampleGroupDescriptionBox being used as a container of item properties. This provides a generic way to reuse existing item properties defined in the standard and to reference them via the sample grouping mechanism without having to define a specific sample group for each existing item property. Accordingly, for instance, the SampleGroupDescriptionBox with grouping_type 'udes' 324 or 424 can be defined by reusing the existing item property of type 'udes' and by replacing the SampleGroupDescriptionBox with grouping_type 'udes' with a SampleGroupDescriptionBox with grouping_type 'ipsg' comprising a SampleGroupDescriptionEntry containing an item property of type 'udes'.

Possibly any or all of the previously described embodiment may be combined together. In particular, the embodiment described in reference to FIG. 4 where the region track contains the definition of the regions and their mapping to annotation may be combined with the embodiment described in reference to FIG. 5 where an annotation track may map annotations to regions defined in a region track. This enables to define initial regions and their annotations inside the region track and then to enrich the annotations for the regions by adding a new annotation track and without changing the initial region track.

According to any one of the previous embodiments, when all the regions defined in a sample of a region track are static and valid for a set of consecutive samples in the associated source track, there is no need to repeat the same region track sample defining the same regions in the region track for each of the corresponding consecutive samples in the source track. In such case, only one region track sample may be defined in the region track for the first sample of the set of consecutive samples in the associated source track and its duration may be set to indicate how long the definition of the regions is valid or apply to consecutive samples of the source track. When the definition of the regions changes, a new region track sample may be defined in the region track.

As an improvement to any one of the previous embodiments, when it is useful to track a region over consecutive samples in the source track, the content creator may signal that the scope of region identifiers extends over several samples in the region track. It means that a same region identifier used in different region track samples actually identifies the same region in the different samples of the associated source track. Otherwise as described above, a region identifier in two different samples of the region track may or may not identify the same region in the different samples of the associated source track. In the prior art, the scope of the region identifiers is the sample. The use of a same region identifier for different samples has no specific meaning regarding the identified regions, which may be the same but may also be different regions.

According to some embodiments, an indication is provided in the metadata describing a region track to indicate that at least some of the region identifiers used in the region track are persistent over at least some of the region track samples of the region track. A scope of region identifiers persistent over samples is useful for tracking regions. On contrary, a scope of region identifiers limited to the sample is useful when splicing separate contents that use the same region ids and can reduce the description cost when multiple regions in a sample are associated with the same set of annotations.

For example, the extent of the scope of region identifiers over samples may be signalled in the sample entry of the region track using a flag. This flag may indicate whether the scope of region identifiers is persistent over all the samples associated with this sample entry or not. For instance, the sample entry RegionSampleEntry describing the samples of a region track may be defined as follows:

Sample Entry Types: 'rgan'
Container: Sample Table Box ('stbl')
Mandatory: Yes
Quantity: One or more sample entries may be present
aligned(8) class RegionTrackConfigBox ( ) extends Full-
    Box ('rgaC', version=0, flags=0) {
    unsigned int (6) reserved=0;
    unsigned int (1) persistent_region_ids;
    unsigned int (1) field_length_size;
    unsigned    int((field_length_size+1)*16)    reference_
        width;
    unsigned    int((field_length_size+1)*16)    reference_
        height;
}
aligned(8) class RegionSampleEntry
extends MetadataSampleEntry ('rgan') {
    RegionTrackConfigBox config; //mandatory
}
where
field_length_size, reference_width, reference_height are
    defined as already described above.
persistent_region_ids is a flag; when set to 1, it indicates
    that the scope of region identifiers is persistent over all
    the region track samples associated with this sample
    entry (possibly all samples of the region track if there
    is only one sample entry in the region track). Other-
    wise, the scope of region identifiers is the region track
    sample.
In a variant, the sample entry can provide a range of region identifiers that are persistent over samples in the region track. For instance, the sample entry RegionSam-pleEntry describing the samples of a region track can be defined as follows:

Sample Entry Types: 'rgan'
    Container: Sample Table Box ('stbl')
    Mandatory: Yes
    Quantity: One or more sample entries may be present
    aligned (8) class RegionTrackConfigBox () extends FullBox
('rgaC', version=0, flags=0) {
    unsigned int (6) reserved = 0;
    unsigned int (1) persistent_region_ids_present_flag;
    unsigned int (1) field_length_size;
    unsigned    int    ((field_length_size    +    1)    *    16)
reference_width;
    unsigned    int    ((field_length_size    +    1)    *    16)
reference_height;
    if (persistent_region_ids_present_flag) {
        unsigned int (32) persistent_region_id_min;
        unsigned int (32) persistent_region_id_max;
    }
}
aligned (8) class RegionSampleEntry
extends MetadataSampleEntry ('rgan') {
    RegionTrackConfigBox config; // mandatory
} where
field_length_size, reference_width, reference_height are
    defined as already described above.
persistent_region_ids_present_flag is a flag; when set to
    1, it indicates that a range of region identifiers having
    a scope that is persistent over samples is present.
    Otherwise, the scope of region identifiers in all samples
    associated with this sample entry is the sample.
persistent_region_id_min and persistent_region_id_max
    are integers that indicates the smallest and largest
    region identifiers in a range of region identifiers having
    a scope that is persistent over all the samples associated
    with this sample entry (possibly all the samples of the
    region track if there is only one sample entry in the
    region track). The scope of region identifiers outside
    this range of values is the sample.
In a variant, a list of region identifiers or a list of range of region identifiers may be signalled in the sample entry.

In another variant, the range of the region identifiers having a scope that is persistent over all the region track samples associated with this sample entry is signalled using a single value. For example, the higher end of this range may be signalled, indicating that all region identifiers smaller than or equal to this value are persistent over all the samples associated with this sample entry.

According to some embodiments, the signalling of a scope of region identifiers that is persistent over region track samples may be signalled using a new sample group with grouping_type 'pris' (or any dedicated 4CC, not conflicting with already defined ones). This sample group can be defined as follows:

Group Types: 'pris'
    Container: Sample Group Description Box ('sgpd')
    Mandatory: No
    Quantity: Zero or one
    class PersistentRegionIdScopeEntry ( ) extends Sample-
        GroupDescriptionEntry ('pris')
    {
    }
Where this sample group is used to indicate region track samples sharing a same scope of region identifiers. All region track samples associated with this entry share the same scope of region identifiers. The grouping_type_param-eter in the SampleToGroupBox with grouping type 'pris' can be used to differentiate different groups of samples having separate scopes of region identifiers in a same track. The value of the grouping_type_parameter may be for example an integer value and this integer value may be interpreted as an identifier of the scope of region identifiers allowing to differentiate two different scopes of region identifiers. When all samples of a region track share the same scope of region identifiers, this can be signalled by using the default sample grouping mechanism (e.g., using a version equal or higher than 2 of SampleGroupDescriptionBox) and a SampleTo-GroupBox with grouping_type 'pris' may be omitted.

As a variant, a dedicated sample group entry is defined for the description of the persistence of the region identifiers, it may be a PersistentRegionIdScopeEntry that defines a range of region identifiers, a list of region identifiers or a list of range of region identifiers having the same scope for all samples associated with a same PersistentRegionId-ScopeEntry. The region identifiers not listed in such Persis-tentRegionIdScopeEntry have a scope limited to the sample.

Alternatively, to indicate that all samples of a region track share the same scope of region identifiers, a specific value (not conflicting with already defined ones) of the flags field may be defined or set in the track header box ('tkhd'). For example, the value track_unique_id_scope=0x000010 may indicate, when set, that all samples of a track having identifiers in their payload share a same scope for these identifiers. For fragmented files, the indication that all samples of a movie fragment of a region track share the same scope of region identifiers may be indicated as a track fragment header flags, using for example the value tf_unique_id_scope=0x000040 indicating, when set that all samples of a track fragment having identifiers in their payload share a same scope for these identifiers. The indi-cation that a sample may carry identifiers in its payload may be indicated by a sample entry type. For example the 'rgan' sample entry type may indicate the presence of identifiers in the region track samples.

In another embodiment, a sample of region track may contain a flag signalling whether the scope of region iden-tifiers for this region track sample is the same as the scope of the previous region track sample or not. When this flag is set to 1, this indicates that a region identifier used in this region track sample and in the previous region track sample identifies the same region in the video samples from the associated source track.

When parsing a media file encapsulating media data according to the previously described embodiments, the parser obtains a first track (source track) of media data samples from the media file. Then the parser obtains a region track associated with the first track from the media file, each sample of the region track comprising a region description data structure describing one or more regions in at least one corresponding sample of the first track, each region described in a region track sample being identified by a region identifier. From the metadata describing the region track, the parser obtains an indication indicating that a set of at least some of the region identifiers used in the region track are persistent over a set of at least some of the region track samples. Then the parser is able to identify the regions in the media data samples of the first track based on the region track samples and based on the indication.

FIG. 6 is a block diagram illustrating an example of steps carried out by a server, writer or any device to generate encapsulated media data and associated annotations accord-ing to some embodiments of the invention.

Such steps may be carried out, for example, in the encapsulation module 130 in FIG. 1.

As illustrated, a first step 600 is directed at obtaining media data comprising a sequence of images for instance by reading the media data on a storage means or by receiving the media data from a communication mean or a capture device.

Next, at step 605, as part of an annotation process, the obtained media data is processed by a user or by applying an object recognition algorithm. The geometry (position and/or shape) of one or more regions are determined in each timed unit (or image) or in some timed units (or images) of the media data.

At step 610, annotations associated with each region are obtained. Annotations are metadata such as human-readable or computer-readable metadata, images, image sequences, video or audio.

At step 615, each region is associated with one or more annotations. A mapping between each identifier of region and associated annotations is determined.

And at step 620, the media data is encapsulated in a source track, the geometries of the regions are encapsulated into a region track and the annotations are encapsulated either in an annotation track or in an annotation item, or in item properties or SampleGroupDescriptionBox according to any one of the embodiments of the invention described in reference to FIG. 3, 4 or 5.

FIG. 7 is a block diagram illustrating an example of steps carried out by a client or a reader to obtain data according to some embodiments of the invention.

Such steps may be carried out, for example, in the de-encapsulation module 170 in FIG. 1.

As illustrated, a first step 700 is directed at obtaining an image from a sequence of images from a media file. Typi-cally, the image is obtained from a sample of a source track (e.g., video or image sequence track) of an ISOBMFF file.

At step 705, the reader obtains from the ISOBMFF file a region track associated with the source track. It determines from this region track the sample that is temporally aligned (time-aligned), or the nearest preceding in the media pre-sentation timeline compared to the sample obtained at step 700. The reader parses the determined sample of the region track to obtain the list of the geometries (position and/or shape) of the regions applying to the sample of the source track obtained at step 700. Each region is identified by a region identifier.

At step 710, the reader obtains mapping information describing the set of annotations associated with each region, the mapping information being encapsulated in the region track or in an annotation track according to any one of the embodiments of the invention described in reference to FIG. 3, 4 or 5.

At step 715, the reader obtains the annotations associated with each region from the mapping information, retrieving the type of the container comprising the annotation (track, item, sample group, track group), the reference type and an index allowing to uniquely identify the annotation according to embodiments of the invention.

Finally, at step 720, the reader processes the image from the obtained sample and its associated annotations. For instance, it may render on a display the image, render each region over the image and display the content of the anno-tation for each region, or each region can represent an interactive area the user can select to access or display associated annotations. According to some aspect of this disclosure, a method of generating a media file is disclosed, the method comprising:

generating a first track of media data samples;
    generating a region track associated with the first track,
        each sample of the region track comprising a region
        description data structure comprising geometry information of one or more regions in at least one corresponding sample of the first track;

wherein:

the region description data structure comprises a region identifier associated with each region; and the method further comprise:

generating a region annotation in a container;

generating association metadata associating a region identifier with the region annotation;

generating a media file including the first track, the region track, the region annotation, and the association metadata.

According to some aspect of this disclosure, the association metadata are comprised in the region description data structure.

According to some aspect of this disclosure, the container of the region annotation is a track group associated with the region track.

According to some aspect of this disclosure, the association metadata are comprised in an annotation track associated with the region track.

According to some aspect of this disclosure, the association metadata are comprised in a data structure describing a group of samples of the annotation track.

According to some aspect of this disclosure, association metadata are provided in the samples of the annotation track.

Figure 8:
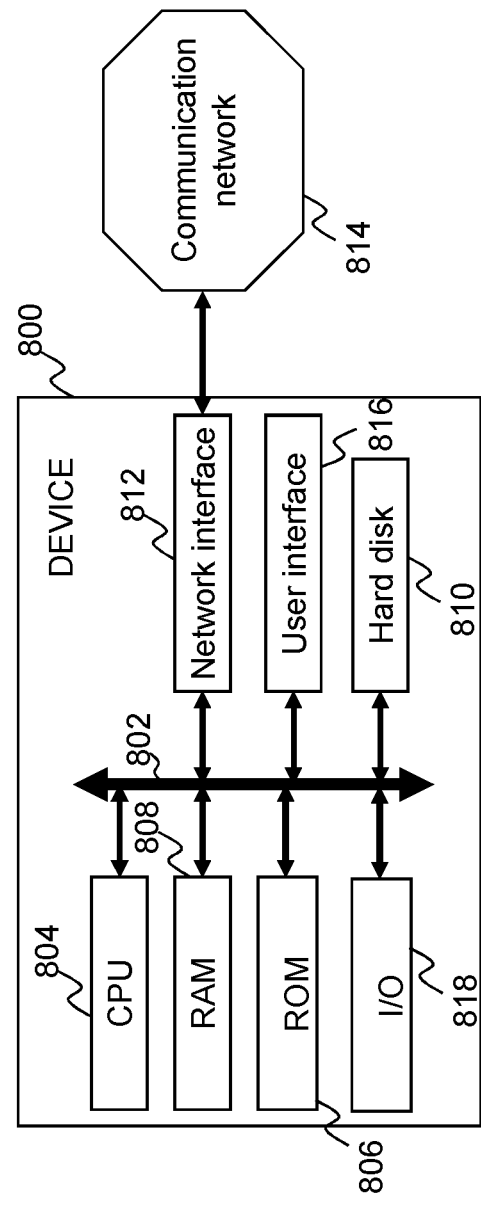
FIG. 8 schematically illustrates a processing device configured to implement at least one embodiment of the present invention.

FIG. 8 is a schematic block diagram of a computing device 800 for implementation of one or more embodiments of the invention. The computing device 800 may be a device such as a micro-computer, a workstation, or a light portable device. The computing device 800 comprises a communication bus 802 connected to:

a central processing unit (CPU) 804, such as a microprocessor;

a random access memory (RAM) 808 for storing the executable code of the method of embodiments of the invention as well as the registers adapted to record variables and parameters necessary for implementing the method for encapsulating, indexing, de-encapsulating, and/or accessing data, the memory capacity thereof can be expanded by an optional RAM connected to an expansion port for example;

a read only memory (ROM) 806 for storing computer programs for implementing embodiments of the invention;

a network interface 812 that is, in turn, typically connected to a communication network 814 over which digital data to be processed are transmitted or received. The network interface 812 can be a single network interface, or composed of a set of different network interfaces (for instance wired and wireless interfaces, or different kinds of wired or wireless interfaces). Data are written to the network interface for transmission or are read from the network interface for reception under the control of the software application running in the CPU 804;

a user interface (UI) 816 for receiving inputs from a user or to display information to a user;

a hard disk (HD) 810; and/or an I/O module 818 for receiving/sending data from/to external devices such as a video source or display.

The executable code may be stored either in read only memory 806, on the hard disk 810 or on a removable digital medium for example such as a disk. According to a variant, the executable code of the programs can be received by means of a communication network, via the network interface 812, in order to be stored in one of the storage means of the communication device 800, such as the hard disk 810, before being executed.

The central processing unit 804 is adapted to control and direct the execution of the instructions or portions of software code of the program or programs according to embodiments of the invention, which instructions are stored in one of the aforementioned storage means. After powering on, the CPU 804 is capable of executing instructions from main RAM memory 808 relating to a software application after those instructions have been loaded from the program ROM 806 or the hard-disc (HD) 810 for example. Such a software application, when executed by the CPU 804, causes the steps of the flowcharts shown in the previous figures to be performed.

In this embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a person skilled in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of generating a media file, the method comprising:

generating a first track of media samples;

generating a second track associated with the first track and comprising at least one sample, each sample of the second track comprising a region definition data structure;

generating a region annotation in a container; and generating a media file including the first track, the second track, and the container comprising the region annotation;

wherein:

the region definition data structure comprises a region geometry information and a region identifier for each of one or more regions in at least one sample of the first track;

the second track further comprises an association data structure providing a mapping between a region identifier and the region annotation, the association data structure comprising the region identifier and associated information for identifying the region annotation; and the information for identifying the region annotation comprises an annotation container type for identifying the type of container comprising the region annotation.

2. The method of claim 1, wherein the association data structure is comprised in a data structure describing a group of samples of the second track.

3. The method of claim 1, wherein the information for identifying the region annotation further comprises:

an annotation reference type identifying a code type of the container comprising the region annotation; and an index for identifying the container carrying the region annotation.

4. The method of claim 3, wherein the annotation container type is one value among at least the following values:

a first value indicating that the container comprising the region annotation is a sample of a track or an item identified by the annotation reference type and the index; or a second value indicating that the container comprising the region annotation is an entry in a data structure describing a group of samples identified by the annotation reference type and the index.

5. The method of claim 1, wherein the container of the region annotation is an entry of a sample group description data structure in the second track.

6. The method of claim 1, wherein the container of the region annotation is a sample of a dedicated track associated with the second track.

7. The method of claim 1, wherein the container of the region annotation is an item associated with the second track.

8. The method of claim 1, wherein at least two region annotations are provided into two different containers.

9. The method of claim 1, wherein the container of the region annotation is an item property in an item property container.

10. The method of claim 1, wherein the container of the region annotation is a track associated with the second track.

11. The method of claim 1, wherein:

metadata describing the second track comprises an indication for indicating that a set of at least some of the region identifiers used in the second track are persistent over a set of at least some of the second track samples.

12. The method of claim 11, wherein the indication is provided in an entry of a sample description box describing second track samples, the set of second track samples being the second track samples described by the entry of the sample description box.

13. The method of claim 1, wherein the association data structure associates one or more sample groups in the second track with one or more region identifiers and further associates the one or more region identifiers with one or more containers each of which comprises a region annotation.

14. The method of claim 1, wherein the second track comprises a first box defining one or more sample groups in the second track and a second box including the association data structure associating the one or more sample groups defined in the first box with one or more region identifiers.

15. The method of claim 14, wherein in a case where the first box defines a plurality of sample groups, the second box includes the association data structure associating each of the plurality of sample groups with each of corresponding region identifiers.

16. The method of claim 14, wherein the media file is compliant with ISOBMFF, and the first box is a SampleTo-GroupBox and the second box is a SampleGroupDescriptionBox.

17. A method for processing a media file, the method comprising:

obtaining a first track of media data samples from the media file;

obtaining, from the media file, a second track associated with the first track and comprising at least one sample, each sample of the second track comprising a region definition data structure;

obtaining, from the media file, a region annotation in a container; and processing one or more regions in at least one media sample of the first track based on an association data structure and the region annotation;

wherein:

the region definition data structure comprises a region geometry information and a region identifier for each of one or more regions in at least one sample of the first track;

the second track further comprises the association data structure providing a mapping between a region identifier and the region annotation, the association data structure comprising the region identifier and associated information for identifying the region annotation; and the information for identifying the region annotation comprises an annotation container type for identifying the type of container comprising the region annotation.

18. A non-transitory computer-readable storage medium storing instructions of a computer program for implementing a method according to claim 1.

19. A device for generating a media file, the device comprising a processor configured for:

generating a first track of media samples;

generating a second track associated with the first track and comprising at least one sample, each sample of the second track comprising a region definition data structure;

generating a region annotation in a container; and generating a media file including the first track, the second track, and the container comprising the region annotation;

wherein:

the region definition data structure comprises a region geometry information and a region identifier for each of one or more regions in at least one sample of the first track;

the second track further comprises an association data structure providing a mapping between a region identifier and the region annotation, the association data structure comprising the region identifier and associated information for identifying the region annotation; and the information for identifying the region annotation comprises an annotation container type for identifying the type of container comprising the region annotation.

20. A device for processing a media file, the device comprising a processor configured for:

obtaining a first track of media samples from the media file;

obtaining, from the media file, a second track associated with the first track and comprising at least one sample, each sample of the second track comprising a region definition data structure;

obtaining, from the media file, a region annotation in a container; and processing one or more regions in at least one media sample of the first track based on an association data structure and the region annotation;

wherein:

the region definition data structure comprises a region geometry information and a region identifier for each of one or more regions in at least one sample of the first track:

the second track further comprises the association data structure providing a mapping between a region identifier and the region annotation, the association data structure comprising the region identifier and associated information for identifying the region annotation; and the information for identifying the region annotation comprises an annotation container type for identifying the type of container comprising the region annotation.

* * * * *